US012413844B2

United States Patent
Sanna et al.

(10) Patent No.: US 12,413,844 B2
(45) Date of Patent: Sep. 9, 2025

(54) IMAGE CAPTURING METHOD

(71) Applicant: OSPEDALE SAN RAFFAELE S.R.L., Milan (IT)

(72) Inventors: Alberto Sanna, Milan (IT); Matteo Zardin, Milan (IT)

(73) Assignee: OSPEDALE SAN RAFFAELE S.R.L., Milan (IT)

( * ) Notice: Subject to any disclaimer, the term of this patent is extended or adjusted under 35 U.S.C. 154(b) by 168 days.

(21) Appl. No.: 18/560,493

(22) PCT Filed: May 17, 2022

(86) PCT No.: PCT/EP2022/063307
§ 371 (c)(1),
(2) Date: Nov. 13, 2023

(87) PCT Pub. No.: WO2022/243304
PCT Pub. Date: Nov. 24, 2022

(65) Prior Publication Data
US 2024/0223884 A1   Jul. 4, 2024

(30) Foreign Application Priority Data

May 20, 2021   (IT) .................. 102021000013115
May 20, 2021   (IT) .................. 102021000013118

(51) Int. Cl.
*H04N 23/611*   (2023.01)
*H04N 23/60*    (2023.01)
*H04N 23/63*    (2023.01)

(52) U.S. Cl.
CPC ........... *H04N 23/611* (2023.01); *H04N 23/63* (2023.01); *H04N 23/64* (2023.01)

(58) Field of Classification Search
CPC ...... H04N 23/60; H04N 23/611; H04N 23/63; H04N 23/64
See application file for complete search history.

(56) References Cited

U.S. PATENT DOCUMENTS 8,723,976 B2 *   5/2014   Imamura ................ H04N 23/73
                                                         348/222.1
2008/0273765 A1 * 11/2008 Tsujimura ............ G06V 40/176
                                                         382/118

(Continued)

FOREIGN PATENT DOCUMENTS

JP        2009210992 A      9/2009

OTHER PUBLICATIONS

PCT, International Search Report and Written Opinion of the International Searching Authority, issued for the corresponding International Application No. PCT/EP2022/063307, mailed Aug. 18, 2022, 12 pages.

*Primary Examiner* — Antoinette T Spinks
(74) *Attorney, Agent, or Firm* — Lucas & Mercanti, LLP

(57) ABSTRACT

An image capturing method (100) using an image capturing apparatus (1) that comprises an imaging device (2) having an image catcher (3) for generating image data, the method (100) comprising displaying (S101), using an image reproducing device (4), images based on the image data, generating (S102) attribute data from a plurality of biological signals measured by a plurality of biological sensors (6), the attribute data being at least an information extracted by one or more biological signals through a computational processing and being indicative of attributes of a user at a time that the user is viewing the images displayed by the image reproducing device (4), generating (S103) significance data based on the attribute data, and associating the attribute data from which the significance data is generated with each displayed image, wherein the significance data are generated by comparing the attribute data with predetermined significance threshold values in order to identify a significance state for each attribute data, controlling (S104) photographic parameters of the image capturing apparatus (1) based on the attribute data, wherein controlling the photographic para- (Continued)

meters comprises at least a variation of said photographic parameters as a function of a variation of at least one biological signal, analysing (S105) the significance data to determine if the displayed images should be stored, wherein analysing the significance data comprises generating at least a significance level from the significance data and comparing said significance level with a triggering threshold level, and storing (S106) the image data of the displayed images together with the attribute data to a storage device (7) based on the analysed significance data.

18 Claims, 19 Drawing Sheets

(56) References Cited

U.S. PATENT DOCUMENTS

2019/0005315 A1   1/2019  Barros et al.
2022/0150401 A1*  5/2022  Tadano ................ H04N 23/611

* cited by examiner

IMAGE CAPTURING METHOD

CROSS-REFERENCE TO RELATED APPLICATIONS

This application is a 371 national phase entry of PCT/EP2022/063307, filed May 17, 2022, which claims the benefit of Italian Patent Application No. 102021000013115 filed May 20, 2021, and Italian Patent Application No. 102021000013118 filed May 20, 2021.

The invention relates to an image capturing method and to a corresponding device and system for capturing an image, the system comprising said apparatus. The invention also relates to a program implementing the image capturing method and a storage medium comprising said program.

Photography is loved by many people, especially nowadays due to the possibility to take a photo at any moment using everyday devices other than traditional photo cameras, such as mobile phones, tablets or laptops. Frequently, people desire to take pictures of a subject during particular situations but they are not always able to capture the so called "magic moment" to render the picture memorable. In fact, in many cases, besides technical aspects, such as the correct light exposure, the camera focus, or the suitable background, the best pictures are the result of emotional sensations that the photographer feels in that particular situation when observing the subject. The emotional sensations are often unconscious feelings that an experienced photographer can usually manage for the purpose of shooting a picture. On the other hand, for the majority of people without particular photographic skills, it is difficult to recognize these sensations and correlate them with the triggering of the photo shooting.

In prior art, several methods and systems are known to recognize emotions. In particular, emotion recognition is a technology to predict people's emotional states based on user responses such as verbal or facial expressions. This technology can be applied in various fields, like health care, gaming, and education. To aid these applications, the technology recognizes emotions in real-time and naturally while the user is experiencing them. For this purpose, wearable devices relying on bioelectrical signals indicating physiological responses of the user can be employed.

However, all these known methods and systems are not sufficiently efficient since are limited in detecting and analysing only the passive or involuntary reactions of a user (i.e. the emotional sensations as a consequence of the visual stimulus) leaving out other important aspects such as the voluntary reactions to said stimulus in terms of cognitive factors. Also, the prior art methods and systems are not configured to bypass the conscious and biomechanical steps leading the user to press the photographic trigger and modify photographic parameters (e.g. zoom, focus, etc.) to capture the image, or part of the image (e.g. due to the zooming of a part of the image), of the subject under observation.

The present disclosure furthermore relates to an apparatus for training a medical image diagnosis model, in particular based on a cognitive and visuo-spatial path generating model. The disclosure also relates to a corresponding method for training a medical image diagnosis. In addition, the disclosure relates to a computer program for implementing said method as well as a storage medium comprising said computer program.

Medical diagnosis is a very complicated process of determining which type of disease or condition explains a person's symptoms and signs. In many cases, a clinician needs to analyse and interpret one or more images of the patient (i.e. X-ray images, MRI or CT scans, etc.) before providing a diagnosis. The way that an image is analyzed by a clinician and consequently how the final medical diagnosis is obtained can be affected by errors due to low experience or to bad practice of the clinician.

To improve the accuracy and efficiency of a medical diagnosis, several attempts are provided in prior art to automatize this fundamental task of the clinician. For example, decision and probability theory can be used to construct automatized systems from a database of typical reference cases. In this way, the task of knowledge extraction can be simplified for those clinicians who do not know how they have to come to certain diagnosis.

However, such systems or methods are based on previous diagnosis results carried out by other physicians in similar cases. In other words, a low experienced physician can only rely on the initial information (symptoms and signs) and the final result (medical diagnosis) but cannot obtain knowledge on the procedures followed by the more experienced physician to achieve the final result starting from the initial information. For example, prior art methods and system cannot be employed to correctly interpret the medical imaging of the patient used by the physicians to achieve their results.

Examples of the present disclosure seek to address or at least alleviate the above problems.

According to a first aspect of the invention, there is provided an image capturing method using an image capturing apparatus that comprises an imaging device having an image catcher for generating image data, the method comprising: displaying, using an image reproducing device, images based on the image data;

generating attribute data from a plurality of biological signals measured by a plurality of biological sensors, the attribute data being at least an information extracted by one or more biological signals through a computational processing and being indicative of attributes of a user at a time that the user is viewing the images displayed by the image reproducing device; generating significance data based on the attribute data, and associating the attribute data from which the significance data is generated with each displayed image, wherein the significance data are generated by comparing the attribute data with predetermined significance threshold values in order to identify a significance state for each attribute data; controlling photographic parameters of the image capturing apparatus based on the attribute data, wherein controlling the photographic parameters comprises at least a variation of said photographic parameters as a function of a variation of at least one biological signal;

analysing the significance data to determine if the displayed images should be stored, wherein analysing the significance data comprises generating at least a significance level from the significance data and comparing said significance level with a triggering threshold level; and storing the image data of the displayed images together with the attribute data to a storage device based on the analysed significance data.

In a second aspect of the invention there is provided a program comprising processor readable instructions which, when implemented by a processor, causes the processor to implement the method as defined above.

In a third aspect of the invention there is provided a storage medium comprising the program as defined above.

In a fourth aspect of the invention there is provided an image capturing apparatus, comprising: an imaging device comprising an image catcher operable to generate image data; an image reproducing device operable to display images based on the image data; a processor operable to: generate attribute data from a plurality of biological signals measured by a plurality of biological sensors, the attribute data being at least an information extracted by one or more biological signals through a computational processing and being indicative of attributes of a user at a time that the user is viewing the images displayed by the image reproducing device; generate significance data based on the attribute data, and associate the attribute data from which the significance data is generated with each displayed image, wherein the significance data are generated by comparing the attribute data with predetermined significance threshold values in order to identify a significance state for each attribute data; control photographic parameters of the image capturing apparatus based on the attribute data, wherein controlling the photographic parameters comprises at least a variation of said photographic parameters as a function of a variation of at least one biological signal; analyse the significance data to determine if the displayed images should be stored, wherein analysing the significance data comprises generating at least a significance level from the significance data and comparing said significance level with a triggering threshold level; and store the image data of the displayed images together with the attribute data to a storage device (7) based on the analysed significance data.

In a fifth aspect of the invention there is provided an image capturing system comprising: a plurality of biological sensors; and an image capturing apparatus as defined above.

According to an aspect of the disclosure, there is provided an apparatus for training a medical image diagnosis model that is based on a cognitive and visuo-spatial path generating model, the apparatus comprising: a display device operable to display a medical image to be inspected for a medical condition by a user, the medical image being associated with an image type; an eye gaze tracker operable to track the gaze of the user as they view the medical image while performing a diagnosis of the medical condition associated with the medical image, so as to generate eye gaze data; one or more biological sensors operable to measure biological signals indicative of a neurophysiological reaction of the user as they inspect the medical image, so as to generate neurophysical reaction data; a storage device operable to store diagnosis data indicative of a diagnosis of the medical condition associated with the medical image by the user, and to store the cognitive and visuo-spatial path generating model; and a processor operable to: analyse the medical image to identify image features of the medical image that are from a set of image features associated with the image type of the medical image, so as to generate image feature data; associate the image features as indicated by the image feature data with the eye gaze data and the neurophysical reaction data so as to generate image diagnosis metadata; and train the cognitive and visuo-spatial path generating model to generate visuo-spatial cognitive path data based on the image diagnosis metadata, in which the visuo-spatial cognitive path data defines a visuo-spatial path with respect to the medical image together with associated neurophysical reaction data that is indicative of a significance attributed by the user to regions of the medical image when performing a diagnosis to arrive at a correct diagnosis.

In an additional aspect of the disclosure there is provided a method for training a medical image diagnosis model that is based on a cognitive and visuo-spatial path generating model, the method comprising: displaying, on a display device, a medical image to be inspected for a medical condition by a user, the medical image being associated with an image type; tracking, using an eye gaze tracker, the gaze of the user as they view the medical image while performing a diagnosis of the medical condition associated with the medical image, so as to generate eye gaze data; measuring, using one of more biological sensors, biological signals indicative of a neurophysiological reaction of the user as they inspect the medical image, so as to generate neurophysical reaction data; storing, using a storage device, diagnosis data indicative of the diagnosis of the medical condition associated with the medical image by the user, and the cognitive and visuo-spatial path generating model; analysing, by a processor, the medical image to identify image features of the medical image that are from a set of image features associated with the image type of the medical image, so as to generate image feature data; associating, by the processor, the image features as indicated by the image feature data with the eye gaze data and the neurophysical reaction data so as to generate image diagnosis metadata; and training, using the processor, the cognitive and visuo-spatial path generating model to generate visuo-spatial cognitive path data based on the image diagnosis metadata, in which the visuo-spatial cognitive path data defines a visuo-spatial path with respect to the medical image together with associated neurophysical reaction data that is indicative of a significance attributed by the user to regions of the medical image when performing a diagnosis to arrive at a correct diagnosis.

In a further aspect of the disclosure there is provided a computer program comprising computer readable instructions which, when implemented on a computer, causes the computer to carry out a method as defined above.

In another aspect of the invention there is provided a storage medium comprising the computer program as defined above.

Other aspects and features are defined in the appended claims.

Examples of the disclosure may make possible to use the attribute data, therefore not only the physiological attributes of the user but also the cognitive and emotional attributes, to adjust the photographic parameters (e.g. focus, zoom in/out, light exposure, . . . ) of the image capturing apparatus, for example a camera, and to capture an image, to be stored with the corresponding image data.

Also, examples of the disclosure may make it possible to train a model and to tune the parameters of the model in order to obtain a satisfactory result in terms of performance. The generated model can be used to produce new results and then forecast an output. In this way, it is possible to reduce the human error in providing a diagnosis based on medical image interpretation.

Examples of the disclosure will now be described by way of example only with reference to the accompanying drawings, in which like references refer to like parts, and in which.

An image capturing method, image capturing apparatus, and image capturing system are disclosed. In the following description, a number of specific details are presented in order to provide a thorough understanding of the examples of the disclosure. It will be apparent however to a person skilled in the art that these specific details need not be employed in order to practise the examples of the disclosure. Conversely, specific details known to the person skilled in the art are omitted for the purposes of clarity in presenting the examples.

Figure 1:
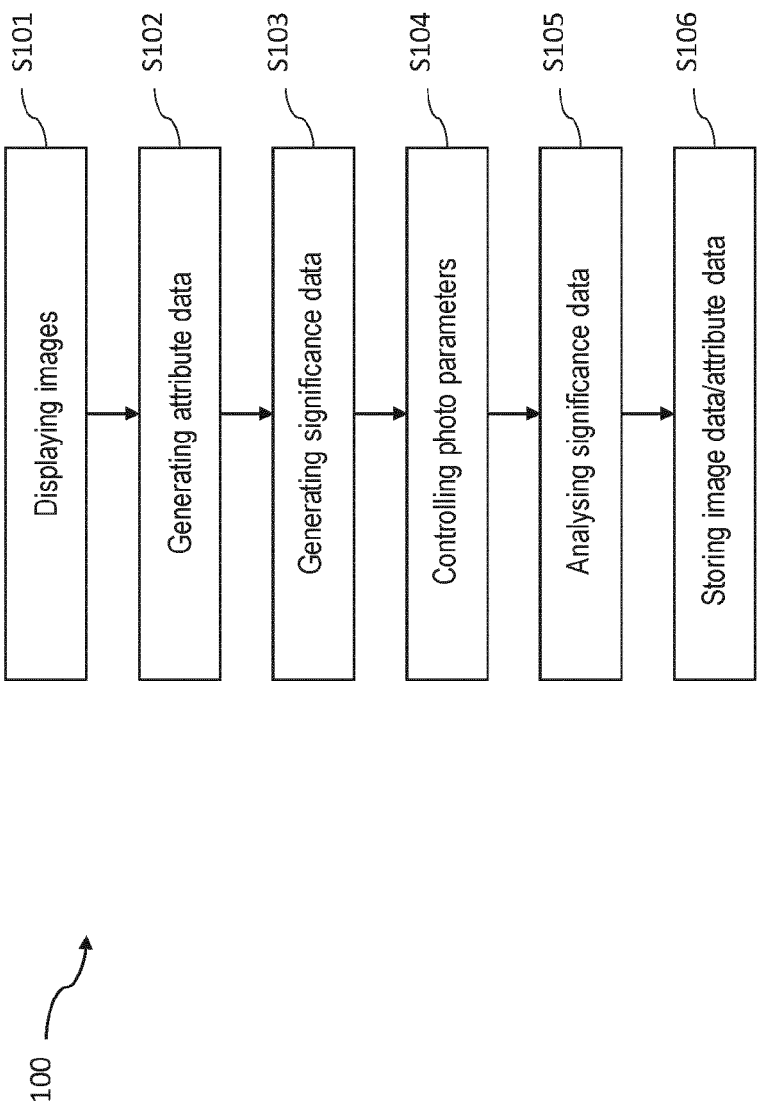
FIG. 1 shows a flow chart of the image capturing method according to an example.
Figure 2:
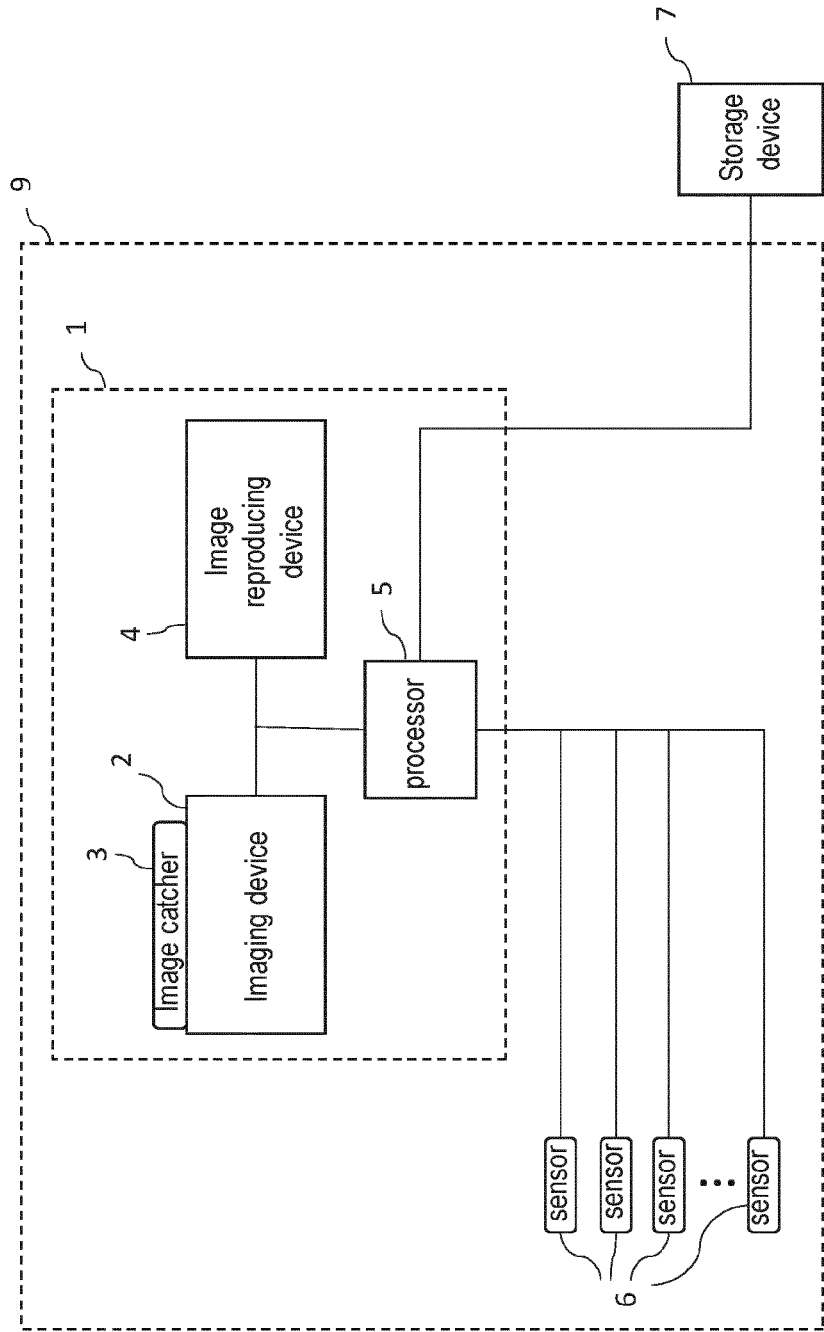
FIG. 2 shows a schematic representation of the image capturing apparatus and image capturing system according to an example.
Figure 3:
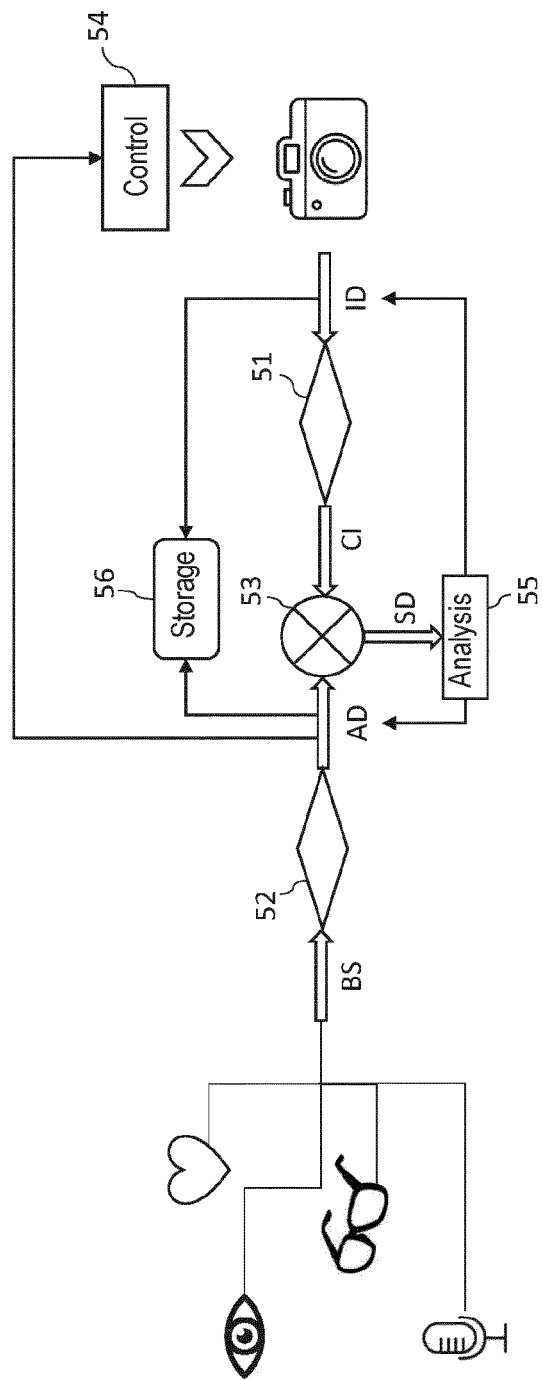
FIG. 3 shows a schematic representation of the data flow for the functioning of the processor according to an example.

FIGS. 1, 2 and 3 are used to describe steps of the method 100 for capturing an image employing the corresponding apparatus 1. The image capturing apparatus 1 comprises an imaging device 2 having an image catcher 3 for capturing an image and for generating image data, and an image reproducing device 4 for receiving the image data and for displaying the image. It is noted that the imaging capturing apparatus 1 can be intended as an apparatus used in a real environment or in an environment of augmented reality, virtual reality, or mixed reality. In other words, this apparatus can be any type of apparatus able to capture and collect images directly from a real environment or from a virtual environment (e.g., image database). Accordingly, the imaging device can be a photo camera or a virtual reality device such as an head-mounted display and the image catcher can be an image sensor or a digital system for catching images, i.e. by cropping digital images. Therefore, the image data generated by the image catcher 3 can be data taken by a photographic sensor or data resulting from a digital operation, i.e. image cropping. In this context, the image reproducing device 4 can be a screen displaying the image or any type of projector/image reproducing system able to show an image to the user or to allow the user to visualize the image (i.e. smart glasses). It is furthermore noted that the imaging device 2, the image catcher 3 and the image reproducing device 4 can be separated elements. Alternatively, at least two of them can be integrated with each other to form a single element. Also, the apparatus 1 comprises a processor 5 connected to both the imaging device 2 and the image reproducing device 4 for processing information data derived from these two devices. The processor 5 is also connected to other devices, such as a plurality of biological sensors 6 and a storage device 7. It is noted that an image capturing system 9 comprises the above-mentioned apparatus 1 and the plurality of biological sensors 6.

At step S101 of the method 100, the image reproducing device 4 is used to display images based on the image data derived from the imaging device 2. The images can be captured by the imaging device 2 or by a device different from the imaging device 2. In other words, the images can be directly captured by the imaging device 2 or can be retrieved by a database, for example in a virtual reality environment. At this point, a user is viewing the images displayed by the image reproducing device 4. Biological sensors 6 are used to measure biological signals of the user and attribute data are generated at step S102 using said signals. In particular, the attribute data are indicative of attributes of a user at a time that the user is viewing the images, and/or a subset of the image, displayed by the image reproducing device 4. In particular, attribute data is intended as any information (numeric and non-numeric) that can be deduced, and then extracted, through computational processing of any biological signal. It is noted that even a raw signal, that is considered as well as the succession of numerical values acquired by the sensor, can represent an attribute data in itself. A photoplethysmography signal (PPG) is for example a signal that highlights over time what is the change in blood pressure within the blood cables. From this signal, it is possible to extract an additional signal known as a heart rate signal.

In a similar way, an attribute data can be represented by a number or a sequence of numbers resulting from the computational processing of a signal obtained from a raw signal. Accordingly, the attribute data represent metadata containing information regarding the different attributes (e.g. physiological, cognitive and emotional) of the user. The attribute data are therefore information data extracted by the biological signals and can represent the information of the biological signal itself or an elaboration of the information of said biological signal.

At step S103, significance data are generated based on the attribute data and the attribute data are associated from which the significance data is generated with each displayed image. It is noted that the concept of "significance" is to be associated with the concept that not all information represents useful information, but each piece of information carries with it a different level of importance and meaning. The level of significance is directly associated with the level of importance. This has value in any field of application, even in non-scientific field. In particular, significance data represent data calculated on the basis of attribute data. Each image data is associated with a particular significance data configuration. Then, it is possible to associate each image data with an overall significance based on the analysis of the significance data and therefore on the attribute data. Significance data are to be interpreted as all numerical information—obtained from the processing of the signals acquired by sensors with which the apparatus interfaces—associated with an image data, and therefore related to a precise temporal instant. The significance data are calculated starting from the acquired biological signals. From these signals, attribute data are obtained, which are compared with predetermined values that identify significance thresholds for each attribute data. Significance data can be intended as attribute data having a particular significance state, the significance state being identified by comparing the attribute data with predetermined significance threshold values. If the attribute data exceeds a predetermined significance threshold value, it can acquire a particular significance state.

The photographic parameters of the image capturing apparatus 1 are controlled based on the attribute data at step S104 and the significance data are analysed at step S105 to determine if the displayed images should be stored and eventually captured. Controlling photographic parameters through the use of attribute data means going to adjust (e.g. tuning) one or more potentially image manipulation functions that can be carried out by the image capturing apparatus 1. This parameters control can be performed in two modes: during the visualization of what is taken by the image capturing apparatus 1 (LIVE case), and/or in post-production (EX-POST case). By considering a capturing apparatus 1 equipped with a zooming system, two examples can be analyzed. In the LIVE case, it can be imagined the implementation of the rule that corresponds to a real-time increase in zoom as a function of the increase in the value of a galvanic skin response (GSR) signal. In this case, the user the apparatus visualizes in real time a zoomed version of what is taken by the apparatus itself. The image (for example a photo shot) shows then a portion of reality taken by the apparatus and already modified by the influence of the magnitude of the zoom effect applied by the apparatus. In the EX-POST case, on the other hand, the image is modified (i.e. it can be modified) and then zoomed at a later time on the basis of the rules of control of photographic parameters. In this case, continuing the example that involves the GSR signal as a controller of the photographic parameter, for each photo shot, a mother photograph can be generated. From this photograph, different dependent photographs can be obtained depending on the configuration of adjustment of the photographic parameters based on the acquired GSR signal.

At step S106, the image data of the displayed images are stored together with the attribute data to a storage device 7 based on the analysed significance data. The attribute data can be stored independently from the displayed images. The storage device 7 can be part of the apparatus 1 or part of the system 9. Alternatively, the storage device 7 can also be located remotely from the apparatus 1 and the system 9, for example in a remote server in a cloud platform.

The functioning of the processor 5 of FIG. 2 is better clarified in FIG. 3. According to this figure, the imaging device 2 is operable to acquire image data (ID) that are displayed, for example through a screen or projected to the eye of the user. One or more captured images (CI) are shown on the screen by a display module 51. The captured images (CI) can be captured by the images device 2 or by a different device. The imaging device 2, can be a photographic type device (e.g. mobile phone, camera etc.) and its related hardware/software for the selection of the multiplicity of shooting parameters (e.g. zoom in/out, focus, exposure, cropping, tilting, filtering etc.) can represent the physical implementation of the apparatus 1. The imaging device 2 can also be a head-mounted display for virtual reality and its related hardware/software for the selection of the multiplicity of shooting parameters (e.g. zoom in/out, focus, exposure, cropping, tilting, filtering etc.) can represent an alternative physical implementation of the apparatus 1. With the term "image reproducing device" is intended to cover any type of device that can cause an image to be reproduced, e.g. active/passive screen, front/rear projection apparatus, direct-on-eye, or direct-on-eye-lens projection.

A set of biological sensors 6 enables the acquisition of the biological (i.e. biomechanical, neurophysiological and cognitive) activity of a user (or more users) and communicates with the apparatus 1 in real-time mode, which can be considered to be a so-called synchronous mode. For example, FIG. 3 shows the employment of four sensors, i.e. a sensor for measuring the heartbeat, a sensor to measure the pupil diameter, a gaze tracker and a microphone. Each sensor is operable to generate a corresponding biological signal (BS). The user interacts with the imaging device 2 through a real-time processing system of signals extracted from the biological sensors 6. However, it is pointed out that in case the signals are collected in asynchronous mode, for example due to biological or hardware/software sensing latency, a given data processing enables a virtual synchronisation, wherein there is first a post-processing of raw data and then predictions based on previously acquired data. In particular, to obviate synchronism problems, the method can further comprise time synchronising the biological signals with each other and/or with the image data. Here, an asynchronous mode can be considered to be a situation in which the timing of the biological signals does not correspond with the timing of the display of the images. It is noted that for actual and future (artistic, emotional, . . . ) post-processing and post-analysis purposes, all the data can be stored as associated metadata. In this way, in addition to a real-time prevision of the signals, it is possible to post-synchronize the signals in order to process and analyse the signals at a later time.

In order to receive the biological signals from the one or more biological sensors, in one example the apparatus can comprise a communication interface.

Attribute data (AD), indicative of attributes of the user at a time that the user is viewing the images displayed, are generated from the biological signals by an attribute data generation module 52 and significance data (SD) are generated by associating the attribute data (AD) with each captured image (CI) by an associating module 53. The attribute data (AD) are also used to control the photographic parameters of the imaging device 2 by a control module 54. It is noted that the photographic parameters can be controlled using dedicated actuators, such as a set of optical, digital and/or mechanical components. At this point, the significance data (SD) are analysed by an analysis module 55 and the image data (ID) are stored together with the attribute data (AD) based on the result of the analysis of the significance data (SD) in a storage module 56. As mentioned above, the image data are stored together with attribute data from the user. According to an example, the attribute data comprises signal data of the measured biological signals. For example, attributes of the user at the time that they are viewing the displayed images, may relate to their heart rate, what part of the image they are looking at, whether they make any vocalisations in reaction to viewing the image etc. Additionally, it will be appreciated that the attributes of the user could relate to their cognitive processes and/or emotions when viewing the images.

Rather that the interaction between the user and the imaging device 2 occurring through interactions of a biomechanical nature (e.g. press the button to take the photo, rotate the lens to zoom in/out focus, regulate/touch screen commands, etc.), the examples of the present disclosure allow a user to interact with the apparatus for example through an artificial intelligence (AI) engine that transforms the data of the signals into cognitive, emotional and decision-making information. For example, if a biological sensor 6 such as an eye-tracking sensor detects a prolonged fixation of a certain portion of the framed scenario, the apparatus 1 can shift its focus to that portion by applying a zoom-in of magnitude proportional to the duration of the fixation. It is noted that this is not intended as an explicit command by the human operator—who is not trained, or in the need of being trained, for learning how to change the modality to obtain such result. On the other hand, the apparatus 1 can process the acquired data to determine the level of significance associated with such physiological data and consequently determine the proper/related set of shooting parameters and actuate a shooting or not-shooting decision output. In fact, the set of biological signals is used as a multivariate parameter for classification of photo shoot triggering: shoot or not-shoot event. This means that a particular cognitive biological state matches the execution of a photo shoot. Note that the user is still allowed to use the imaging device 2 in standard modality, deciding for example when to directly press the button for the shoot. In this case, user emotional/cognitive metadata are associated anyway to the photo shoot for future/post-processing purposes, unless an explicit no-go command is set. Although this functionality may be implemented using artificial intelligence, it will be appreciated that any appropriate form of machine learning could be used based on trained datasets for example. It will also be appreciated that this functionality could be implemented with decision logic, such as fuzzy logic, or any other appropriate logic.

The term "biological sensors" is intended to refer to a set of multiple physiological, behavioural and environmental sensors enabling acquisition of signals or data which are directly and/or indirectly related to physiological, cognitive and emotional attributes of the local user. Accordingly, the attribute data represent metadata containing information regarding the different attributes (e.g. physiological, cognitive, emotional) of the user.

In one example, to improve the efficacy of the method, the significance data may comprise a plurality of significance levels, each associated with a respective biological signal from which the attribute data was generated. Accordingly, analysing the significance data can comprise generating a combined significance level based on the significance levels for each of the biological signals. Also, storing the image data together with the attribute data can comprise storing the displayed images to the storage device together with the attribute data based on a comparison of the combined significance level with a triggering threshold level. This means that the combined significance level could be greater, lower, the same, or some function of the threshold level in order to store the displayed images together with the attribute data. In one example, if the combined significance level exceeds the triggering threshold level, the method can provide an automatic setting of the photographic parameters and trigger shooting of an image without the user having to press a dedicated shoot actuator. However, it is pointed out that any data and information acquired by the image capturing apparatus can be stored regardless of the level of meaning achieved. In this way, examples of the disclosure allow both to conduct experimental analysis on the captured data to generate additional, further and new trigger models of the photo shoot (i.e. ex-post analysis), and to reuse the data stored to generate new photographic shoots based on shooting trigger models other than the one selected during the real-time session. The level of significance can be decided then ex-post, wherein ex-post means quasi-real time and/or any moment later. In principle, it can be reconsidered years afterwards in light of new findings. In other words, the level of significance can also be zero at present, since it is not excluded that level of significance can be determined differently, i.e. higher than a given threshold in the future (quasi-real time to years away) when new knowledge is acquired/discovered that gives to same stored data different level of significance.

In another example, generating the significance data and analysing the significance data can be based on a predetermined shooting model. For example, the shooting model can be an artificial intelligence/machine learning model. In particular, the predetermined shooting model can be generated based on biological signals acquired from a user or a plurality of users when viewing a set of model training images for training the predetermined shooting model. In this way, the model can act as a triggering system of a photographic shoot, able to capture a precise scenario observed by the user at a precise time moment corresponding to a precise biological state identifiable and quantifiable through the identification of a pattern in the values of the signals and in those extracted from them.

In one example, the triggering threshold level is determined according to the predetermined shooting model. In this way, the threshold level can be automatically determined and eventually continuously updated by said model. Also, in order to tune the predetermined shooting model, the method can comprise transmitting the image data of the displayed images together with their associated local biological signals to a shooting model database. For example, the predetermined shooting model may be generated using machine learning based on one or more datasets, for example generated from previously generated attribute data that is associated and/or correlated with physical operation parameters of the imaging apparatus such as time when the image was shot, exposure settings, zoom control, focus etc. Examples are described in more detail later below.

In this context, the concept of multi-parametric significance pattern of recorded signals can be introduced. In other words, the values of the signals used for triggering the shoot are discretized according to some thresholds (i.e. signal thresholds or triggering threshold levels), which identify the boundaries (states) of significance of each signal. For example, the range of values of each signal can be divided into three ranges: low significance, medium significance and high significance. Note that a high significance value indicates a signal condition favourable to triggering the shoot. Assuming a dashboard of sensors that allows the acquisition and processing of six signals, it is possible to build a matrix of 6×3 dimensions. This matrix, updated at each timestamp, represents the configuration of discretized signal values through values 1 and 0, as shown in table I.

TABLE I significance levels for each biological signal

| | Sgn 1 | Sgn 2 | Sgn 3 | Sgn 4 | Sgn 5 | Sgn 6 |
|---|---|---|---|---|---|---|
| High Significance | 1 | 0 | 0 | 1 | 1 | 1 |
| Medium Significance | 0 | 0 | 1 | 0 | 0 | 0 |
| Low Significance | 0 | 1 | 0 | 0 | 0 | 0 |

Each signal is given a weight. Then, a value is assigned to each level of meaning for each signal. These values represent the importance of the signal in providing emotional-cognitive status information. By attributing a weight to each level of meaning for each signal, the above matrix transforms in a significance matrix as follows (Table II).

TABLE II significance matrix

|  | Sgn 1 | Sgn 2 | Sgn 3 | Sgn 4 | Sgn 5 | Sgn 6 |
|---|---|---|---|---|---|---|
| High Significance | 1 × 1.5 | 0 × 1.2 | 0 × 1.7 | 1 × 0.8 | 1 × 1.1 | 1 × 2.1 |
| Medium Significance | 0 × 1 | 0 × 0.8 | 1 × 1.1 | 0 × 0.6 | 0 × 1.0 | 0 × 1.4 |
| Low Significance | 0 × 0.2 | 1 × 0.4 | 0 × 0.5 | 0 × 0.1 | 0 × 0.6 | 0 × 0.9 |

Once the values of the individual entries of the significance matrix are obtained, they are added together providing a numerical value, called the overall significance (OS). It is noted that the overall significance varies over time, following the synchronous sampling frequency of the signals. With each update of the array, it is compared with a reference value, i.e. the triggering threshold level. If the overall significance exceeds the threshold level, the system (e.g. the processor 5) provides an automatic setting of shooting parameters (e.g. focus, exposure etc.) and triggers the photo shooting without the user having to press the shutter button.

Although Tables I and II give examples of significance levels and significance matrices, it will be appreciated that any number of significance levels could be used, and any number of signals could be used, for example depending on the model and the desired control of the apparatus. It will also be appreciated that the significance levels could be different for controlling different aspects of the apparatus. For example, greater significance weights may be given to signals associated with eye gaze and where the user is looking when controlling aspects such as zoom and focus. As another example, when determining shooting triggering (e.g. triggering the shutter), greater weight may be given to signals more associated with emotion, such as heart rate.

Figure 11:
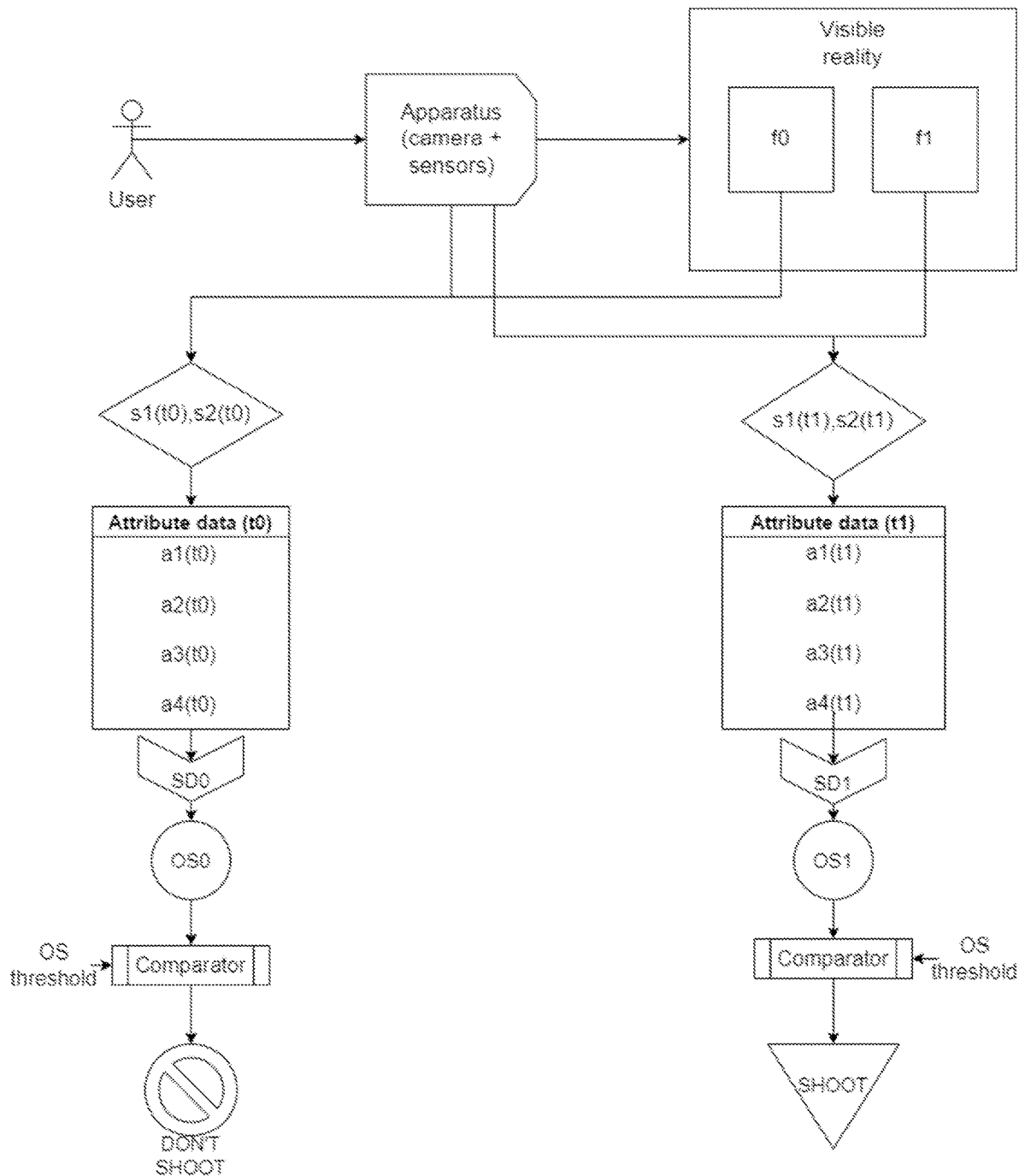
FIG. 11 shows a block diagram of the triggering process of a photo shoot.

To better clarify the analysis of the significance data to determine if the displayed images should be stored, it is referred to FIG. 11. This figure illustrates a process 700 for triggering a photo shoot. For example, the user is using a technological apparatus consisting of a camera to which two sensors are connected for the acquisition of the pulmonary respiration signal (s1) and photoplethysmography (s2). These signals represent the signals from which the processing system proceeds with the extraction of the attribute data. In particular, four attribute data can be obtained named as a1, a2, a3, a4; wherein a1=s1, a2=s2, a3 is the rate signal of respiratory acts extracted through signal processing methods from s1 and a4 is the heartbeat rate signal over time extracted through signal processing methods from s2. It is noted that the two of the attribute data (a1 and a2) correspond to the biological signals, whereas the other two attribute data (a3 and a4) are a combination or elaboration of the two biological signals. It is noted that each image sampled (frame) by the apparatus is associated with data significances, that is, a set of values assumed and processed by the attribute data is associated at the particular moment in which the frame was sampled from the apparatus. A user is visualizing, through the apparatus, at the instant to a portion of reality and at the instant $t_1$ (with $t_0 \neq t_1$) another portion of reality. The two frames sampled by the apparatus are denoted as $f_0$ and $f_1$ respectively. Each frame is associated with a set of significance data that are named $SD_0$ and $SD_1$, respectively. For each attribute data, some thresholds are predetermined. These thresholds discretize the attribute data themselves. Furthermore, these thresholds identify the significance states of each attribute. For example, the range of values that can be assumed by each given attribute can be divided into three levels: high, low, and medium significance. Therefore, each attribute data can be expressed locally (i.e. at each moment of time associated with the sampling of a frame) with an array of values similar to the table I above. It is noted that the columns of Table I are related to single signals Sgn1-Sgn6 as attribute data. However, the columns can be related also to a combination of signals or elaboration of signals. For examples, the columns can be related to the attribute data a1-a4 of the present example.

The entries of the significance matrix are 0 or 1 depending on the specific value assumed by the single attribute given in relation to its significance thresholds. Note that a high significance value indicates a favourable attribute condition to triggering the shoot. Each attribute data is given a weight. Then, a value is assigned to each level of significance for each attribute data. These values represent the magnitude/importance of the attribute data in providing subject status related information. By attributing a weight to each level of significance for each attribute data, the above matrix transforms in a significance matrix (Table III). It is noted that in the following matrix, the values 0 and 1 are not provided.

TABLE III weights of significance data

|  | a1 | a2 | a3 | a4 |
|---|---|---|---|---|
| High Significance | ×1.5 | ×1.2 | ×1.7 | ×0.8 |
| Medium Significance | ×1 | ×0.8 | ×1.1 | ×0.6 |
| Low Significance | ×0.2 | ×0.4 | ×0.5 | ×0.1 |

For each time stamp in which a frame is sampled, the matrix in table III is filled with 0 and 1 depending on the significance value of the specific attribute data. In the following, for example, the significance matrix, that are SDs, associated with $f_0$ and $f_1$ are respectively shown.

TABLE IV significance data associated with frame $f_0$

|  | a1 | a2 | a3 | a4 |
|---|---|---|---|---|
| High Significance | 1 | 0 | 0 | 1 |
| Medium Significance | 0 | 0 | 0 | 0 |
| Low Significance | 0 | 1 | 1 | 0 |

TABLE V significance data associated with frame $f_1$

|  | a1 | a2 | a3 | a4 |
|---|---|---|---|---|
| High Significance | 0 | 1 | 0 | 1 |
| Medium Significance | 1 | 0 | 1 | 0 |
| Low Significance | 0 | 0 | 0 | 0 |

Tables IV and V show the evidence that implies that in each column of the matrix only one 1 is permitted, whereas the other revenue of the matrix must be equal to 0. The procedure that leads to the automatic trigger of the photo shoot requires that the elements of the significance matrix are added together and compared with a global threshold of triggers. The sum of the elements for each array is an overall significance (OS). There would be an $OS_0$ associated with $f_0$ and an $OS_1$ associated with $f_1$. According to this example, $OS_0=3.2$ and $OS_1=4.1$. Assuming that in the triggering model of the photo shoot a global trigger threshold of 3.8 is predetermined, the frame $f_1$ produces the photo shot while the frame $f_0$ does not produce any results.

Figure 4:
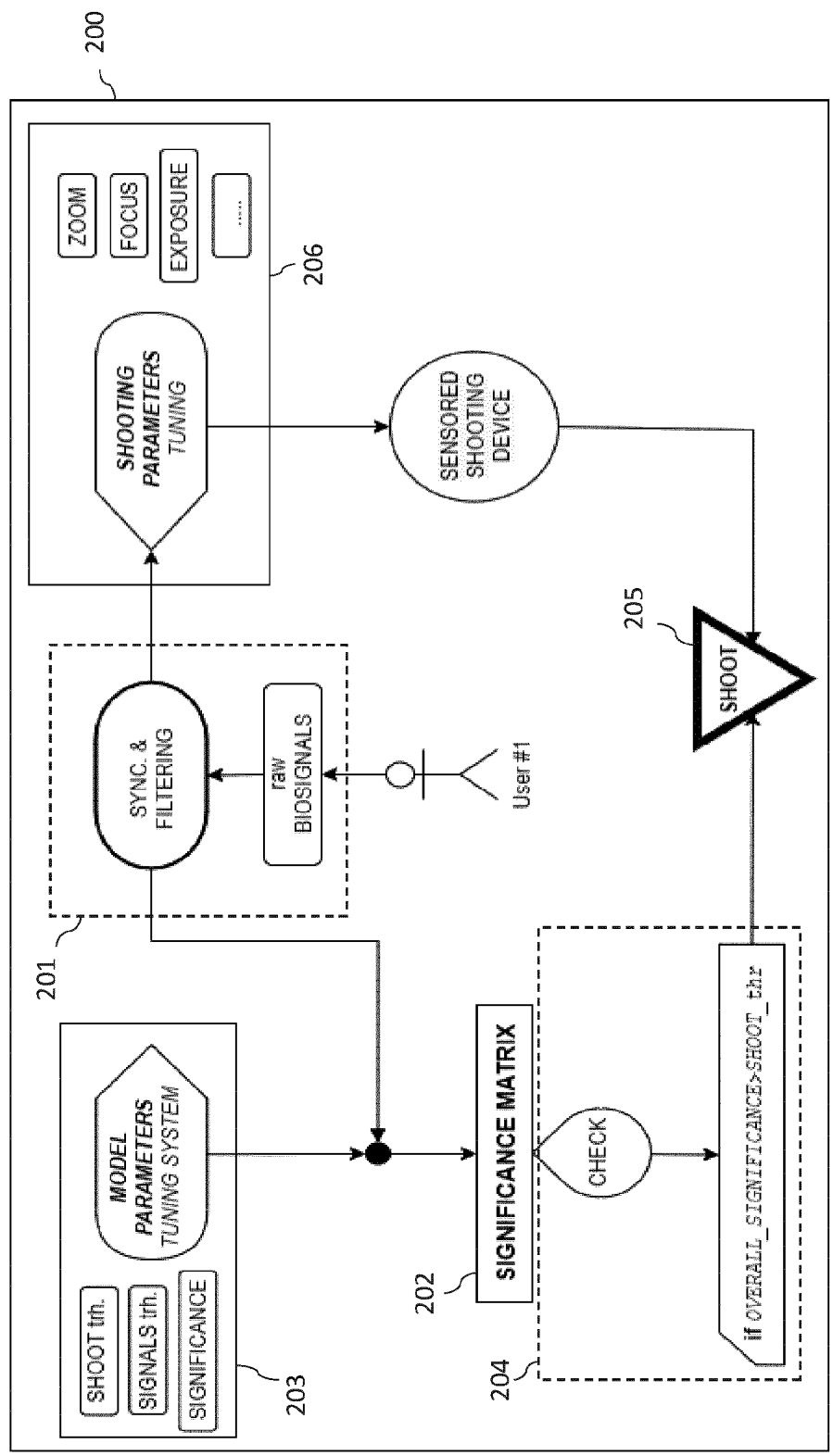
FIG. 4 shows a schematic diagram of the process for triggering a shoot of a imaging device using the image capturing method according to an example.

The process 200 for triggering a shooting is summarized and illustrated in FIG. 4. The user visualizes the surrounding reality using an imaging device 2, i.e. a photo system. Information about the biological activity of the user is measured by biological sensors 6. Raw biological signals are extracted and are synchronized with each other and with frames sequences captured by the imaging device 2 in an acquisition and filtering module 201. A significance matrix is built in a significance matrix module 202 and significance data are generated, based on the measured biological signals and the model parameters, i.e. the signal thresholds, the weights of the significance levels and the triggering threshold level, analysed in the model parameters module 203. The overall significance is calculated and a comparison is carried out with the triggering threshold level in the checking module 204. A shoot by the imaging device 2 is triggered by the shooting module 205 based on a particular relationship between the value of the overall significance and the triggering threshold level (for example the overall significance value is greater than the triggering threshold level). The shooting parameters, i.e. zoom, focus, exposure, are automatically tuned based on the synchronization and filtering process before the shooting in the shooting parameters module 206.

All data are recorded as photo metadata in a given photographic format that contains not only raw photographic signals data but also raw human-extracted data. This format enables a series of individual and collective post-processing tools, as well as training data to further enhance accuracy, sensibility and predictability at the individual and collective user level. Signal thresholds, weights of each significance level, and triggering threshold level (i.e. the model parameters) can be adjusted using one of the following two types of decision logic.

In particular, the image capturing system has a modular configuration comprising a user interface to show audio-visual stimuli, an operator interface to monitor and manage each stimuli, and an arrangement of sensors to record biological signals. Besides managing interactions among these three elements, an AI module automatically processes acquired and synchronized biological signals recorded from a user during a visualization of an audio-visual stimulus (input) defining biological dynamics and indexes. The aim of this processing is to return a revised visual representation of the stimulus (output) modified according to the subjective cognitive perception of the original stimulus, as well as some cognition related parameters. The output is generated by matching information extracted from the user biological signals during the stimulus submission and the stimulus itself, resulting in an augmented visual representation of the input. The signal processing procedure varies from signal to signal, but generally it is constituted by an initial phase in which a single signal is filtered to enhance a particular behaviour and a second stage in which different signal analysis algorithms are applied in order to extract specific indexes that briefly describe the signal trend. Both the filtered signals and the extracted indexes are considered as information matcher and can be considered as metadata associated to that specific process. The system allows simultaneously acquiring one or more biological signals and the AI model processes each signal in order to obtain the desired output.

Differently from prior art approaches, the present apparatus and system aim not only to elaborate and return indexes which reflect some bio-dynamical behaviour of the user, but different indexes extracted from signals and the signals themselves are used as moderators of the user subjective perception of the stimulus proposed. In fact, through the particular processing stage, it is possible to produce a cognitive re-elaborated version of the input.

Figure 5:
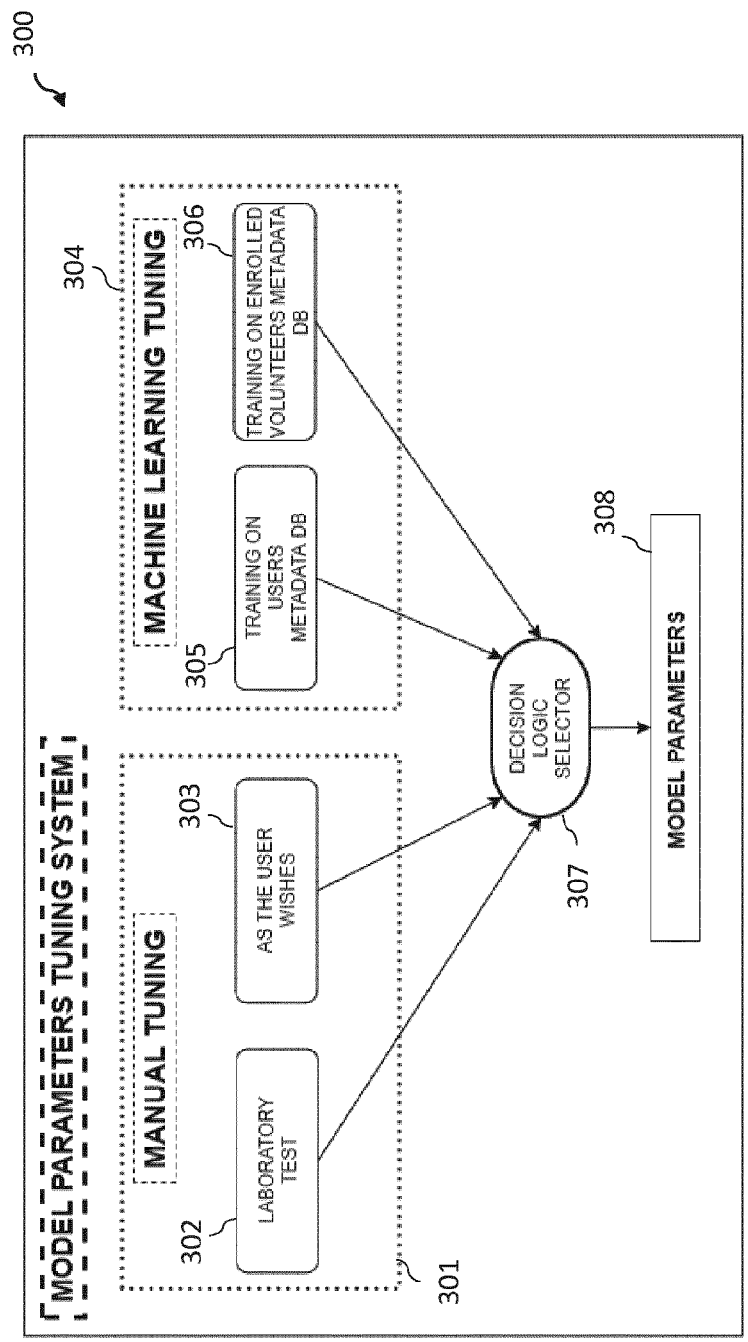
FIG. 5 shows a model parameters tuning system.

FIG. 5 illustrates a process 300 employing the model parameters tuning system. According to a first logic, the model parameters are tuned manually 301. For example, the configuration of these parameters can be identified by the manufacturers of the apparatus 1 following experimental laboratory tests on the nature and information conveyed by the signals 302. Alternatively, the user has the possibility to adjust the parameters by himself 303.

According to a second logic, on the other hand, the different configurations of the model parameters can be identified by Machine Learning systems 304 trained using signals acquired by the user (or users) during their shooting sessions 305. That is, by default each user who uses the apparatus 1 can share his metadata—signals and personal information—in a database accessible to authorized parties. Additionally or alternatively, clinical trial-like activity can be performed on cohort of voluntary enrolled users to determine such parameters with the appropriate level of statistical power 306. Depending on the cluster or grouping to which the users or sessions belong, a different configuration can be produced 307. As a consequence, model parameters are determined 308.

According to a further example, the user is a local user that is local to the image capturing apparatus, and the attribute data comprises local attribute data that is associated with a time that the local user is viewing the images displayed by the image reproducing device. In other words, for example, the user may be physically holding the image capturing apparatus, which may be a camera, smart phone, video camera etc.

In another example, the user is a remote user that is remote to the image capturing apparatus, the image reproducing device is local to the remote user, and the attribute data comprises remote attribute data that is associated with a time that the remote user is viewing the images displayed by the image reproducing device.

In a still further example of the apparatus, the user can be a local user that is local to the image capturing apparatus, and the attribute data can comprise local attribute data that is associated with a time that the local user is viewing the images displayed by the image reproducing device. In particular, the apparatus can comprise a communication interface operable to receive remote attribute data from a plurality of remote user devices associated with different remote users, each remote user device having a respective remote image reproducing device for displaying the images captured by the imaging device, and each remote user device being operable to generate the remote attribute data from a plurality of remote biological signals measured by a plurality of remote biological sensors, the remote attribute data being indicative of attributes of the remote users at a time that the remote users are viewing the images displayed by their respective remote user image reproducing devices. In this case, the significance data can be generated based on the local attribute data and the remoted attribute data.

In this context, the terms "local" and "remote" are to be intended as within or outside a certain distance from a reference point. For example, a local user is intended as a user in close proximity to, or within a threshold distance of, a device, i.e. the image capturing device. In this case, the user can directly interact with the device, by directly touching it, through connecting means, such as a cable, or through a wireless communication, preferably a short range wireless communication, such as Bluetooth, near-field magnetic induction, . . . . On the other hand, a remote user is intended as a user far away from, or outside a threshold distance of, a device, i.e. the image capturing device. For example, the remote user can employ a real-time communication system (e.g. local or widespread 5G telecommunication infrastructure) to acquire information from the image capturing device and eventually transfer data to a cloud and an edge-computing architecture connected to the image capturing device. It is noted that the image reproducing device is preferably located in close proximity, that is "local", to the remote user to allow an image reproduction of image data deriving from the image capturing device.

For example, the image capturing device may be located to capture images of a wildlife scene, such as in an environmentally challenging location or where having a user present would be disturbing to the wildlife. The captured images may be transmitted from the image capturing device to the image reproducing device located in a safer location that would not disturb the wildlife.

In a configuration where a local user and remote user are present, the method can further comprise displaying the images captured by the imaging device on a plurality of remote user image reproducing devices which are associated with different remote users. Also, the method can comprise generating remote attribute data from a plurality of remote biological signals measured by a plurality of remote biological sensors, the remote attribute data being indicative of attributes of the remote users at a time that the remote users are viewing the images displayed by their respective remote user image reproducing devices. In particular, the method can comprise tuning the predetermined model based on user input from the different remote users. This may help generate a more comprehensive, effective and accurate model because data from diverse users and diverse images may be obtained more easily.

The present method 100 for capturing images can therefore be employed in different scenarios.

In a first scenario (scenario 1:1), the user is the only source of biological information for triggering the shoot. In this individual dimension, the user is connected to biological sensors 6 and the apparatus 1 receives and elaborates data from said sensors 6, which are extracting information from the given user, to decide through the overall meaning value when and whether to trigger a shoot. The set of metadata recorded during each shooting session is stored in a personal database, and the user himself can accept or modify model parameters based on experimental observations, personal creativity or based on Machine Learning algorithm training.

In a second scenario (scenario 1:N), the triggering of the shoot does not take place only on the basis of the overall significance value of the individual user using the device. In fact, in this scenario, different users (i.e. protagonist viewers) visualize in real-time what a main user is viewing (e.g. concept of screen sharing). At the same time, each protagonist viewer is equipped with different sensors that acquire biological signals and through a real-time communication system (e.g. local or widespread 5G telco infrastructure), transfer information to the cloud and an edge-computing architecture is connected to the main user's imaging device 2. Information transferred from protagonist viewers consists of the overall meaning value that is updated at each timestamp. Again, the parameters of the model can be adjusted according to one of the two logics described above. The shoot, therefore, will not be triggered by the comparison of the overall significance of the main user with the triggering threshold level alone. On the other hand, at each timestamp the imaging device 2 of the main user comprises a vector of collective significance, together with the individual values of the overall meaning of the individual users.

Table VI shows the vector of collective significance—five viewers (V) and one main user (MU)—at a specific time moment.

TABLE VI

| vector of collective significance | | | | | |
|---|---|---|---|---|---|
| MU | V1 | V2 | V3 | V4 | V5 |
| OS 7 | 6.5 | 7.1 | 3.1 | 5.6 | 6.2 |

Using one of the two tuning logics of the model parameters, the MU can decide not only the parameters of the model of the other viewers, but also how much importance to attribute to the individual components of the vector of collective significance, as shown in table VII below.

TABLE VII

| weighted vector of collective significance | | | | | |
|---|---|---|---|---|---|
| MU | V1 | V2 | V3 | V4 | V5 |
| OS 7 × 2.3 | 6.5 × 1.6 | 7.1 × 2.1 | 3.1 × 2.9 | 5.6 × 1.3 | 6.2 × 1.6 |

The sum of the individual components of the vectors can then be compared with a triggering threshold level to trigger a photo shoot based on emotional and cognitive reactions and processes acquired by a community of people.

A third scenario, (scenario N:N) enables a network of users to share with each other (devices) the signals acquired during the display of the same viewed reality (from multiple visual and biological perspectives). Each user can decide what kind of tuning of the adjustment parameters to opt for, depending on the photo shoot he/she wants to trigger.

A fourth scenario (scenario neurocognitive research users' profiling based on ML) can be applied to any of the three scenarios described above. This scenario enables the extraction of metadata associated to each user for the purpose of research and improvement of the sensibility and accuracy (generally, the performances) of the system, as well as for the extraction of new socio-cognitive emotional patterns/models and the creation of new individual and collective system performances and features. Once stored in a database, these data can be used to find common cognitive patterns among individuals, and then new triggering methods based on social metadata.

Figure 6:
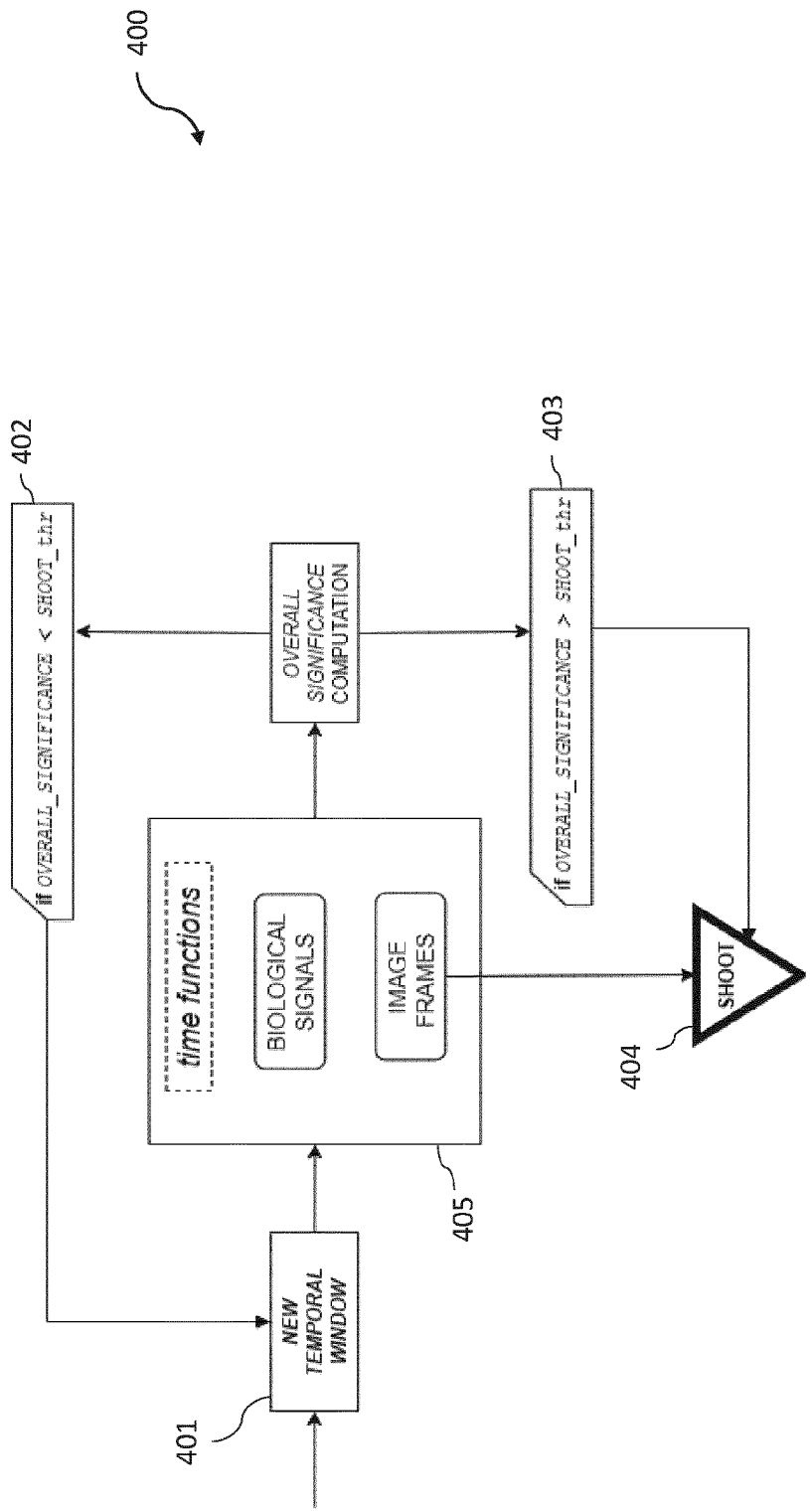
FIG. 6 shows a schematic diagram of the process to cope with asynchronous signals.

It should be pointed out that in case the available technology does not allow the processing and sharing in almost real-time of the biological data extracted from the users, the structure of the flow of analysis of the significance for photo-triggering can be implemented in different ways. In particular, the signals can be stored and analysed in time windows synchronized with the individual frames of images taken from the imaging device 2. In this way, the signals can be processed retrospectively, isolating the frame corresponding to the passing of the shooting threshold. Alternatively, the implementation of a real-time signal prediction system can prevent the use of the decision logic described above, as illustrated in FIG. 6. According to this process 400, a new temporal window can be employed 401 to synchronize signals with image frames 405. In other words, this can be considered to be an example of time synchronising the biological signals with each other and/or with the image data. The new temporal window is used if the comparison between the overall significance and the triggering threshold value does not satisfy determined requirements 402. On the other hand, if the comparison between the overall significance and the triggering threshold value does satisfy determined requirements 403, a shooting is performed 404 in combination with the image frames information.

As mentioned above, the generation and analysis of the significance data are based on a predetermined shooting model. This model can be a AI/ML model performed a priori using a set of recordings that, processed in order to extract information (i.e. signal processing and features extraction), act as training (and test) sets to feed and adjust the parameters of the model itself. Subsequently, in a second phase, the performance of the model and its structure can be improved/modified through updates resulting from an increase in the size of the training (and test) set, rather than the use of new technologies to extract new signals or the use of new and innovative mathematical methods to extract information from the signals themselves.

The term "recording" refers to the set of different biological signals acquired through a set of non-invasive biological sensors 6, e.g. wearable sensors, from a user while he/she is acting for taking a photo, starting from the moment the user approaches to visualize a scenario through a lens until the user decides to capture what is framed through the photo shoot itself.

The aim of the model building phase is to generate an AI system able to autonomously identify one or more patterns within the values of biological signals, which suggest a relationship between photographic shooting and the biological-cognitive-emotional state of the user. In this way, the model can act as a triggering system of the photographic shoot, able to capture a precise scenario observed by the user at a precise time moment corresponding to a precise biological state identifiable and quantifiable through the identification of a pattern in the values of the signals and in those extracted from them. In addition, each recording is associated with a defined number of quantitative and qualitative information related to the user such as photographic experience, age, number of photos taken, etc. This information acts as moderators for statistical analysis, grouping the various recordings into specific clusters from which it is possible to generate and moderate different outputs/shoots (i.e. different model configurations depending on the type of output desired). For example, it can be used a trained shooting model configuration on recordings of ultra-experienced photographers, or rather photographers highly interested in nature landscapes. It is noted that each model configuration has additional conformations in numbers equal to the number of combinations (without repetition and without interest in order) of extracted signals. For example, it is possible to take advantage of a configuration that triggers a photo shoot based on the ultra-experienced photographer cluster by analysing only selected biological signals (e.g. the photoplethysmogram (PPG) signal and galvanic skin response (GSR) signal), rather than a superset of these signals.

In the model training and building phase, the algorithm is fed with data extracted from the signals of the individual recordings. In particular, it optimizes the size of the time window prior to the shoot used to isolate a part of the signals. Then, it is considered a combination of features extracted from those signals that best classifies the shooting event based on the value patterns of the features themselves. Before this stage it is therefore necessary to set up a primary database of different registrations.

The Machine Learning model is therefore a supervised binary classification system: shoot or not-shoot. This model can be represented by a Classification Random Forest through which, with the appropriate and refined tuning of the adjustment parameters of the model itself, it is possible to obtain a predictive system capable of triggering a photo shoot. For each cluster identified by grouping recordings based on moderators, a specific configuration of the model is generated, thus able to identify a specific pattern in the signal values, as well as a particular condition of the emotional and cognitive state of the person.

The result of the whole process is a set of templates that new users can use. Once trained and made available, these models are integrated into a software system embedded in a photographic device, for example in the firmware of the device. Regardless of how it is used (i.e. choosing the specific cluster to refer to for the production of the photograph and then choosing the type of model), a user is able to employ the apparatus 1 by simply equipping himself with biological sensors 6 capable of extracting the signals used for the training of the model or a subset of them. In order to increase the performance of the different model configurations, user registrations enriched with related personal information (i.e. moderators) can be stored to increase the size of the primary database. In this way, this database can be periodically used as a new database for new model building phases. The new model configurations generated can then be integrated into photo devices and considered as system updates.

As mentioned above, an image capturing system 9 can be represented by the apparatus 1 for capturing images combined with one or more biological sensors 6 applied to a user. While the user is observing real objects and/or landscapes surrounding him/her (i.e. the same objects and landscapes captured by a photographic lens of the imaging device 2 in the form of images), information about his/her biological activity is extracted from his/her body in a non-invasive way. This is done using both wearable sensors and/or sensors not directly connected to body parts such as sensor systems belonging to the IoT world.

The biological signals can be acquired using different non-invasive sensors 6 which exploit several technologies. These sensors 6 are connected directly or indirectly with the biomechanical, cognitive and emotional—conscious or unconscious—processes triggered in the human being or in an animal (e.g., pets like dogs or cats) by visual and other sensorial-stimuli. Since each animal is a sentient being, it is possible to trigger a photo shoot using the animal "emotional" feedback either alone or mixed with the human ones. In this way it is simple to scale up the process using not only one human cognitive-emotional feedback but more than one, resulting from the monitoring of the emotion and cognition of N people.

In particular, the sensors 6 are either embedded in the triggering ("shooting") system (DSLRcam/smartphone) or they can be distributed in the environment through the use of wireline/wireless-connected sensors (e.g. wearable sensors and/or IoT sensors extracting signals/data from other detecting systems located in the environmental premises where the user is potentially interested in taking pictures).

For example, a photo camera can receive data from:
1. several wearable non-invasive sensors worn by a principal user who handles the camera;
2. several wearable non-invasive sensors integrated in different technological dashboards fitted to other secondary users and wireline/wireless connected with the camera of the principal user; and/or
3. several environmental IoT sensors able to traduce body language and emotional-cognitive dimensions of different individuals (e.g. in a field/square/street), wherein are several lenses are present. When the environmental and/or wearable sensor system catches a particular response in the individual or crowd behaviour, a photo shoot is triggered from one or more lenses. That is, the system is able to interpret and rationalize the individual or crowd cognitive-emotional behaviour.

The camera can be handheld or worn by the direct user, embedded in other handheld systems or embedded in wearable accessories (e.g., hats, glasses, helmets, jackets, gloves, rings, bracelets), as well as operated remotely by a human, animal or robotic operator (e.g., mobile robots, air or water drones, vehicles in general including boats) being real time controlled by an individual or a multiplicity of connected users. For example, a drone or a dog is equipped with a camera and has the ability to move (autonomously or driven). The camera is triggered to shoot based on the cognitive-emotional process elaborated from a technological sensors system the acquire signal from an individual or a crowd.

In the following, an indicative list of sensors is mentioned that can be used as biological sensors according to the present method, apparatus and/or system. The list is not intended to be exhaustive in terms of relevant signals (other discoveries will in the future provide evidence of new psycho-physiological parameters affecting the scope of the present patent). It can be considered for example how the use of non-linear analysis tools (i.e. quantifying complexity, variability, of the signal) on the simple heartbeat signal allows the extraction of fundamental information about the neurological state of the person, even reaching the detection of emotions through the same signal alone. Another example consists in the fact that new technologies are able to measure and quantify in a non-invasive way biological variables that before it was unthinkable to measure (e.g. pupil diameter, $SpO_2$). Furthermore, some discoveries will probably be generated by the platform described in the present disclosure. In this way, the sensor list is not intended to be exhaustive in terms of usability (as in the future miniaturization of electronic in sensing, processing, wireless connecting, energy harvesting will favour integration of a multiplicity of detecting systems and eventually improve usability and user experience of the triggering ("shooting") system). For example, just considering the innovation and progress in telephony (from the Telephony Booth, to the telecommunications system integrated into a smart wristwatch).

The biological sensors 6 can comprise at least one of the following:
GSR signal (Galvanic Skin Response)
PPG signal (Photoplethismography)
Gaze Position
EEG signal (Electroencephalography)
Facial Expression
ECG signal (Electrocardiogra
EMG signal (Electromyography)
Pupil Diameter
Body Movement Language (inertial, haptic, gesture, etc. . . . )
Natural Spoken Language (microphone)
Natural Emotional Language (microphone)
fNIRS signal (functional Near Infra-Red Spectroscopy)
Blood Oxygenation level
Biochemical parameters (e.g. cortisol, dopamine, noradrenaline)
Geo-localization signal (GPS, WiFi, Bluetooth, 5G)
IoT environmental sensors (e.g. body language detectors)

By way of example, an eye tracker sensor could acquire the gaze position signal and the pupil diameter signal, including the speed of its contraction. In this case, it could be conceivable to detect the oxygen concentration trend in the pupil, the dopamine level from the speed of the pupil contraction, the heartbeat from the ocular pressure behaviour or the biochemical agents concentration in the retina from a fluorescent excitation ocular response. Then it could be possible establishing a correlation between these extracted parameters/trends and the cognitive-emotional state as a bio-imaging processing software may acquire and decode signals from molecules in the eye blood. As this particular example, the eye tracker sensor could be embedded in the shooting system (e.g., in the lens or in the screen of a reflex or bridge camera in a smart phone, in the frame or lens of glasses), and could track the ocular movement allowing the software system to record which details of the image captured the attention of the user.

The fNIRS technology can represent another example. As it is a wearable set of sensors, it cannot be physically integrated into the system, but it can communicate with it through wire/wireless communication protocols, easily allowing different users to interact with their fNIRS acquired activity with the camera.

So far, sensors are described that acquire signals from a singular user. However, it is conceivable a social platform by means of which the acquisition can be triggered by a multiplicity of digitally connected users present on site or active remotely by means of their emotion or cognitive processes, so that the input data could comprise also biological signals and information coming from a social (human and/or animal) community, which can then interact with the system handled by the principal user or by a human, animal, robotic.

Figure 7:
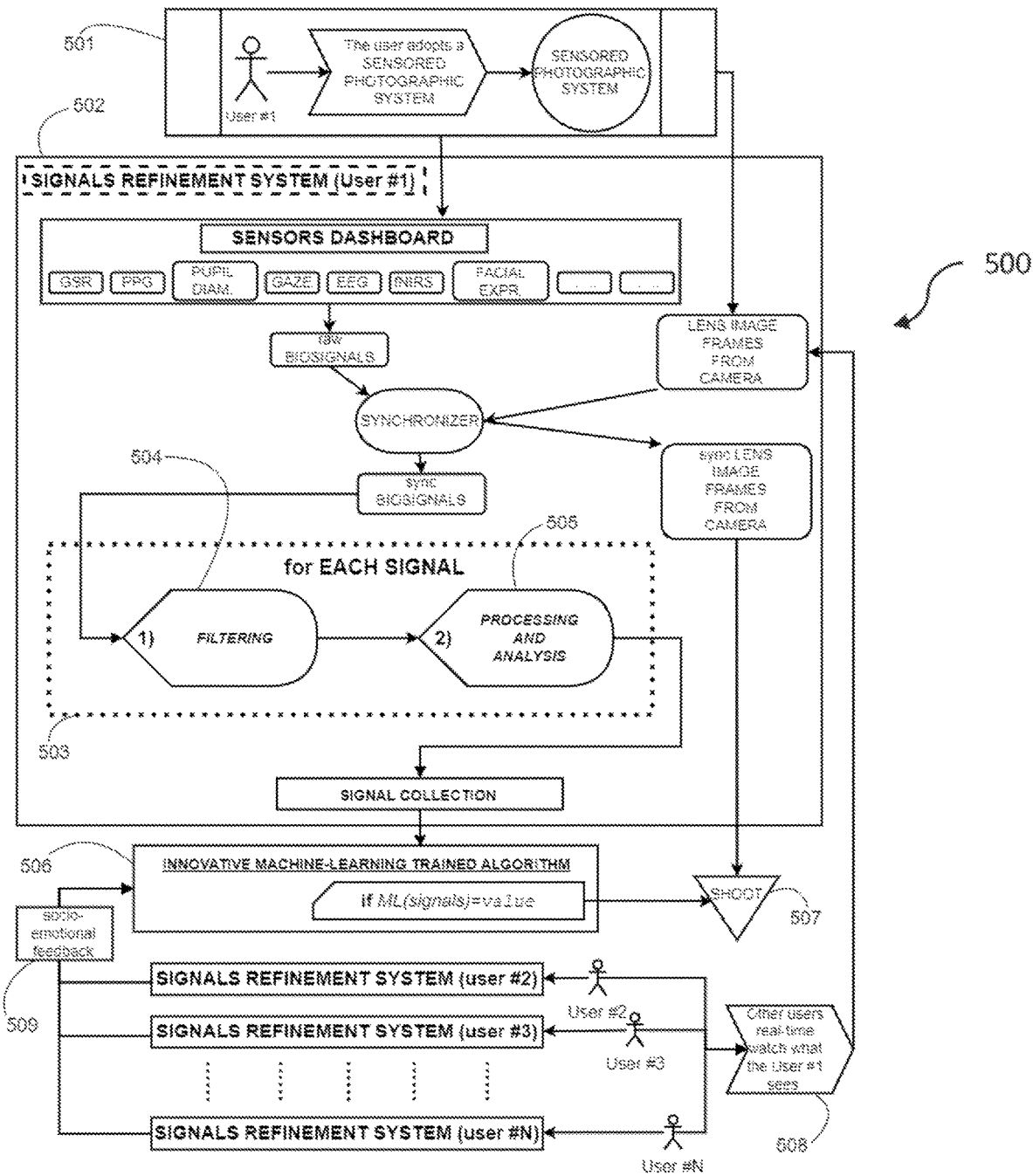
FIG. 7 shows a schematic diagram of the process for triggering a shoot of a imaging device with a single user and a plurality of additional users.

FIG. 7 schematically illustrates an example of the process 500, wherein a main user (user #1) employs a photographic system with sensor elements 501. In a signal refinement system 502, the dashboard of sensors extracts 502 different types of signals of raw quality (i.e. as they are collected) that are synchronized both with each other and with the sequence of frames captured by the photographic lens, in order to have a unique correspondence between each timestamp and information recorded during the course of the process. According to this example, a plurality of biological sensors are utilised, such as GSR, PPG, pupil diameter, gaze position, EEG, fNIRS, facial expression, . . . . Signals obtained from the synchronization process go through a two stage processing 503. Each signal is filtered 504 with appropriate and personalized techniques aimed at reducing typical signal noise or due to human artefacts. These filtered signals undergo numerical analysis techniques 505 for extracting indices and signals that represent trends or figures of merit explanatory of the cognitive and emotional state of the user. In particular, while the system is continuously acquiring image frames and signals from the different sensors, the integrated software system filters the signals and analyses them. The analysis consists in the automatic research of a specific pattern in the values of the signals, such that, once an optimal criteria is matched, the system freezes the image and a photo is generated. Furthermore in the digital file all physiological metadata recorded are saved (as presently it happens with the "raw" format and other elaborated photo formats—e.g., Jpeg—which contains data from arrays of light sensors and other basic technical data derived from the camera configuration, the associated GPS coordinates, etc.). Once extracted, the signal outputs are ready to be used to search for a triggering pattern for the photo shoot through a Machine Learning (ML) system based on classification model 506. This system receives incoming outputs of the filtering, processing and analysis phase and, based on previously adjusted tuning parameters, identifies a time instant at which the specific emotional cognitive pattern is used resulting in the shooting of a photograph (i.e. immortalizing the frame for that time instant) 507.

Similarly, it is possible to consider an ecosystem of a plurality sensors for detecting and collecting emotional and cognitive information from multiple individuals (user #2, user #3, . . . user #N) who interact with a main user (user #1) in the way they view the same portion of reality identified by the photographic lens. In fact, through the same signals refinement system, cognitive and emotional trends and figures of merit are extracted from different users that go to feed a hub, which contains emotional socio-feedback completely synchronized with those of the main user 508. It is pointed out that not only a single user but also a plurality of users can feed as input the ML system 509.

Figure 8:
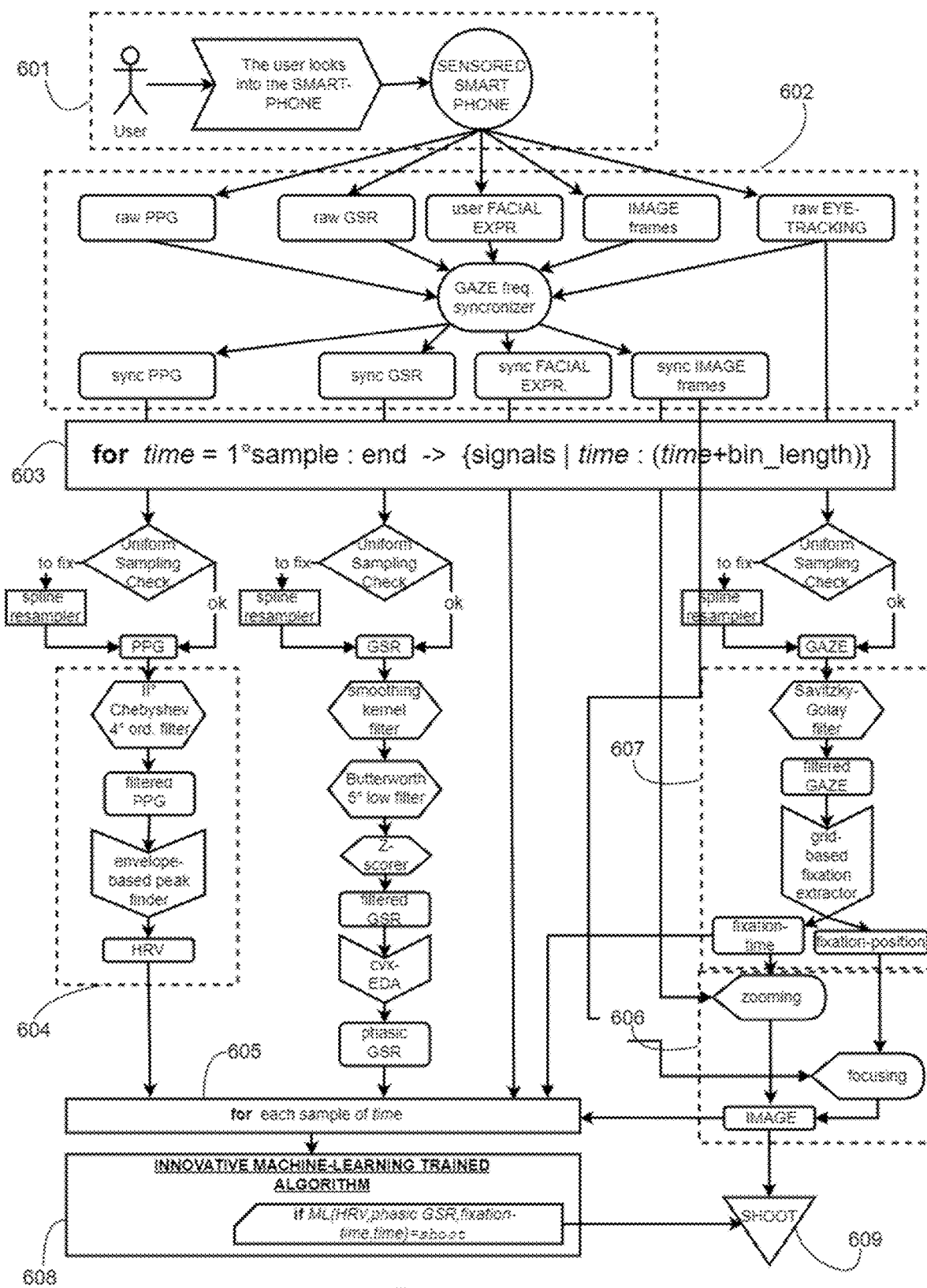
FIG. 8 shows a flowchart of an image capturing system with a mobile phone as imaging device.
Figure 9:
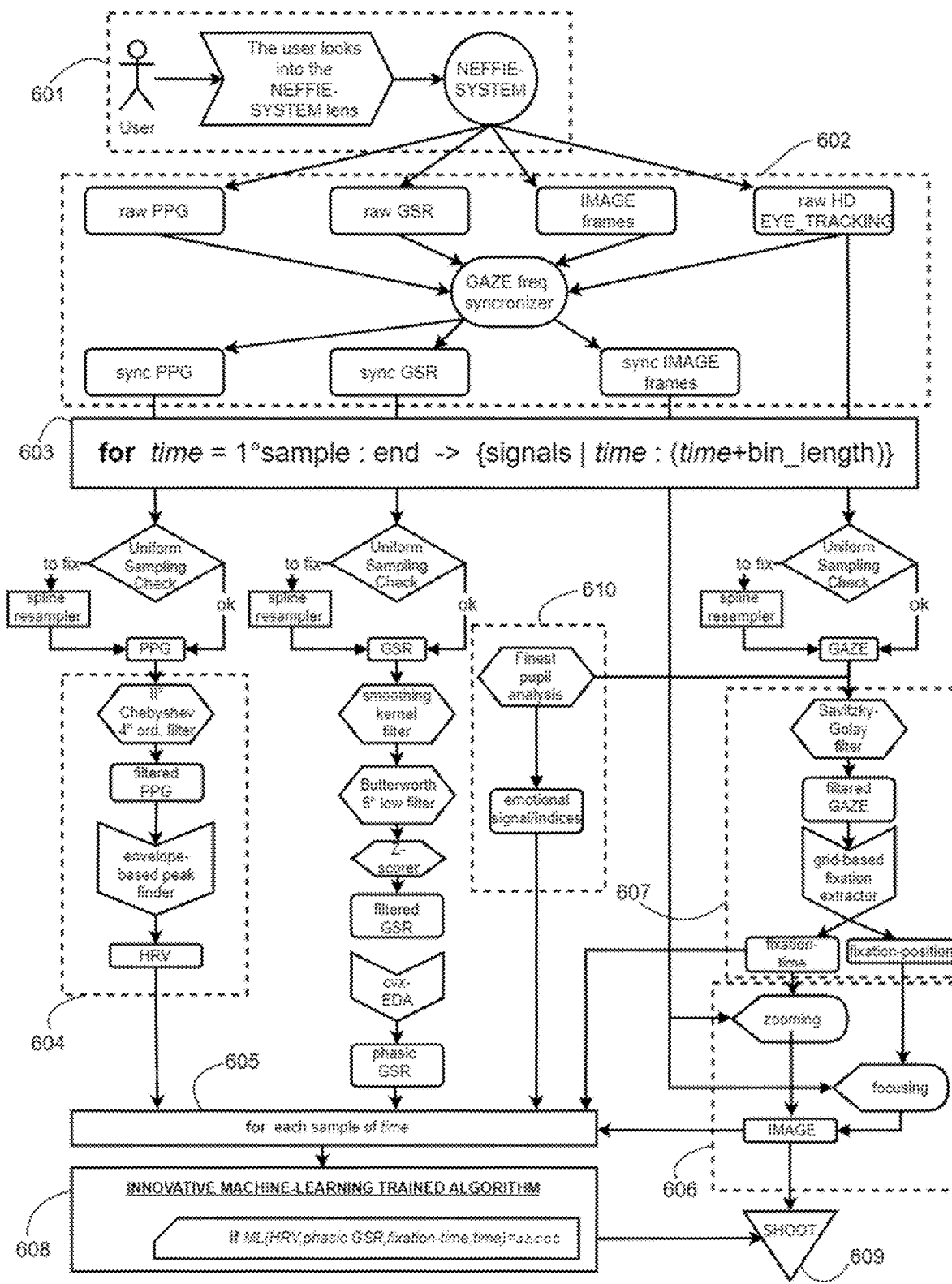
FIG. 9 shows a flowchart of an image capturing system with a photographic device as imaging device.

FIGS. 8 and 9 illustrate both a flowchart describing a process employed in an image capturing system, wherein the imaging device is a mobile phone (FIG. 8) or a photographic device (FIG. 9). The process of these figures basically corresponds to the process shown in FIG. 7 for a single user.

In FIG. 8, the user looks at a mobile phone or smartphone 601. The smartphone is equipped with biological sensors 6 to detect and collect raw biological data (e.g. PPG, GSR, facial expression, image frames, and eye-tracking). The raw signals are synchronized with each other together with frame sequence 602. The synchronized signals are then filtered. In particular, a first filtering process (i.e. data binning) is carried out 603. It is noted that based on the measured biological signal, a dedicated second filtering process can be used. For example, in case of a PPG signal, a uniform sampling check is performed and then a filtering stage using a type-II Chebyshev filter (IV order) 604. The filtered PPG then undergoes an envelope-based peak finder to evaluate the heart rate variability (HRV). The other biological signals undergo identical or similar processes. The filtering stages are carried out for the biological signals for each sample of time 605. The synchronised image frames are used to control and adjust photographic parameters such as the zooming and the focusing 606. These parameters are also controlled based on the results of the eye-tracking signals in terms of fixation time and fixation position 607.

The filtered signals are input to a ML trained algorithm 608 to identify a time instant for shooting 609. It is noted that the photographic parameters are adjusted before shooting based on the analysis of the image frames.

In FIG. 9, the user employs an apparatus with a photographic device instead of a smartphone. In this case, some biological signals, such as the facial expression, are not taken into account. However, other parameters can be considered, such as a finest pupil analysis 610. Apart from this, the process of FIG. 9 is the same as in FIG. 8. Accordingly, the same reference numerals are identified.

The machine learning training process is developed upon previous explorative sessions conducted on subjects recruited because of their ability in the manual photo-shooting. The system will learn from their cognitive processes carried out before and during the shooting instant. In this way, the user will not be the one that decide when to shoot but its cognitive and biological process will drive unconsciously the software to shoot, emulating the biological and cognitive process of more experienced photographer. This approach represents the first level of development, thereby allowing a user to shoot a photo as an expert photographer would do using patterns from other photographer (i.e. clustered based on the user desirability).

This is systematically in action with more than a single individual, i.e. a given self-defined set of individuals according to explicit or implicit affinity criteria, or the totality of users are generating big data set that can be used to determine meaningful patters, thus reinforcing machine learning algorithms' efficacy.

A deeper level of the system functioning consists in the possibility for a user to shoot a photo as they desire without knowing/being aware of its cognitive-emotional processes, but allowing the shooting system to measure, quantify and define the cognitive emotional state of the user itself during the time (i.e. "assisted photography").

In order to improve the accuracy and the efficiency of the system, a starting point can be a limited number of cognitive pathways from an experienced photographer. However, it is also interesting to comprehend and further explore how a common user (e.g. not necessary with photographic experience) feels and reacts in front of a camera images acquisition, coming to define what kind of cognitive-emotional patterns would trigger a shoot.

The concept is that the system allows to generate and use different "triggering filters" which are represented by the way a particular user (e.g. the user themselves, their friend, the experiential photographer, etc . . . ) shoots a photo.

In addition, users can be clustered to see how they behave and what types of information they aggregates. Once a large amount of metadata is obtained (e.g. from several thousands or millions of images), through ML clustering methods based on affinity criteria (supervised or unsupervised) the user could cause a triggering filter (predetermined shooting model) to be generated based on the cognitive and emotional reactions they want to emphasize.

Furthermore, starting from the data and/or metadata of individual users and their extracted information, it is possible to consider the generation and feeding of a social system (e.g. "Instagram of Neuroscience") that is disruptively able to do the following:
1) Share pre-processed content with a social network of people promoting informed and self-awareness communication of the cognitive developed processes/pathways;
2) Product new artistic, cognitive and emotional contents starting from the analysis of cognitive-biological information extracted and associated with the subject who is watching a particular content of the social. (e.g. a user observes a particular shared image and biologically react to it. The Instagram of Neuroscience is able to produce a tangible cognitive-emotional feedback of the visualization).

Figure 10:
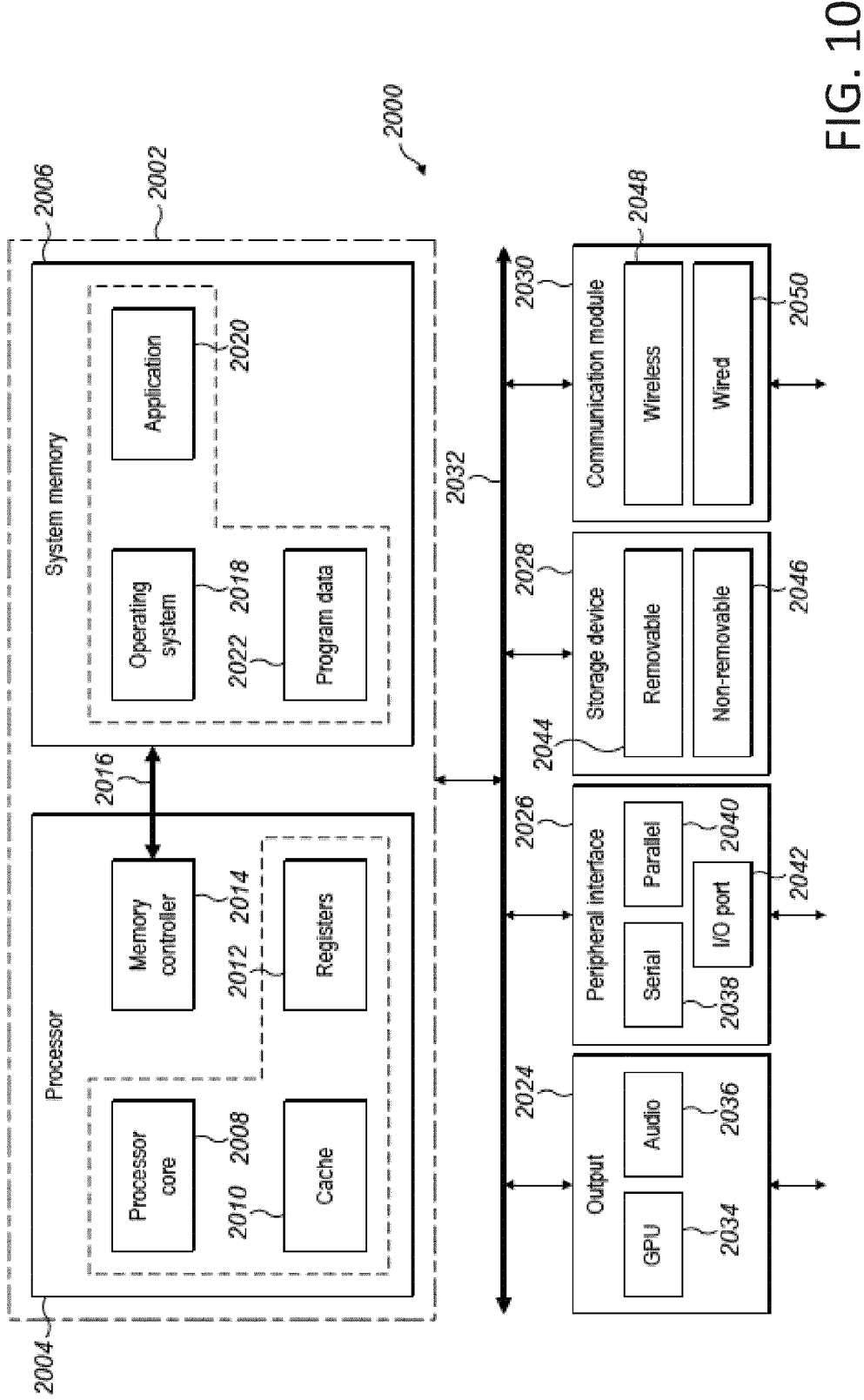
FIG. 10 shows a schematic representation of a computer system.

FIG. 10 schematically shows a computer system for implementing methods of examples of the disclosure. In particular, FIG. 10 shows an example of a computing device 2000 for example which may be arranged to implement one or more of the examples of the methods described herein. In examples, the computing device 2000 comprises main unit 2002. The main unit 2002 may comprise a processor 2004 and a system memory 2006. In examples, the processor 2004 may comprise a processor core 2008, a cache 2010, and one or more registers 2012. In examples, the processor core 2008 may comprise one or more processing cores and may comprise a plurality of cores which may run a plurality of threads. The processor 2004 may be of any suitable type such as microcontroller, microprocessor, digital signal processor or a combination of these, although it will be appreciated that other types of processor may be used.

In examples, the processor core 2008 may comprise one or more processing units. In examples, the processor core 2008 comprises one or more of a floating point unit, an arithmetic unit, a digital signal processing unit, or a combination of these and/or plurality of other processing units, although it will be appreciated that other processing units could be used. In examples, the cache 2010 may comprise a plurality of caches such as a level one cache and a level two cache, although other appropriate cache arrangements could be used.

In examples, the processor 2004 comprises a memory controller 2014 operable to allow communication between the processor 2004 and the system memory 2006 via a memory bus 2016. The memory controller 2014 may be implemented as an integral part of the processor 2004, or it may be implemented as separate component.

In examples, the system memory 2006 may be of any suitable type such as non-volatile memory (e.g. flash memory or read only memory), volatile memory (such as random access memory (RAM)), and/or a combination of volatile and non-volatile memory. In examples, the system memory 2006 may be arranged to store code for execution by the processor 2004 and/or data related to the execution. For example, the system memory may store operating system code 2018, application code 2020, and program data 2022.

In examples, the application code 2020 may comprise code to implement one or more of the example methods described herein, for examples to implement the steps described above with reference to FIGS. 1, 8 and 9. The application code 2020 may be arranged to cooperate with the program data 2022 or other media, for example to allow the control of photographic parameters or the storing the image data together with the attribute data.

In examples, the computing device 2000 may have additional features, functionality or interfaces. For example main unit 2002 may cooperate with one or more peripheral devices for example to implement the methods described herein. In examples, the computing device 2000 comprises, as peripheral devices, an output interface 2024, a peripheral interface 2026, a storage device 208, and a communication module 2030. In examples, the computing device comprises an interface bus 2032 arranged to facilitate communication between the main unit 2002 and the peripheral devices.

In examples, the output device 2024 may comprise output devices such as a graphical processing unit (GPU) 2034 and audio output unit 2036 for example arranged to be able to communicate with external devices such as a display, and/or loudspeaker, via one or more suitable ports such as audio/video (A/V) port. In examples, the peripheral interface 2026 may comprise a serial interface 2038, a parallel interface 2040, and a input/output port(s) 2042 which may be operable to cooperate with the main unit 2002 to allow communication with one or more external input and/or output devices via the I/O port 2042. For example, the I/O port 2042 may communication with one or more input devices such as a keyboard, mouse, touch pad, voice input device, scanner, imaging capturing device, video camera, and the like, and/or with one or more output devices such as a 2D printer (e.g. paper printer), or 3D printer, or other suitable output device. For example, signals may be received via the I/O port 2042 and/or the communication module 2030. In examples, the storage device may comprise removable storage media 2044 and/or non-removable storage media 2046. For example, the removable storage media may be random access memory (RAM), electrically erasable programmable read only memory (EEPROM), read only memory (ROM) flash memory, or other memory technology, optical storage media such as compact disc (CD) digital versatile disc (DVD) or other optical storage media, magnetic storage media such as floppy disc, magnetic tape, or other magnetic storage media. However, it will be appreciated that any suitable type of removable storage media could be used. Non-removable storage media 2046 may comprise a magnetic storage media such as a hard disk drive, or solid state hard drive, or other suitable media, although it will be appreciated that any suitable non-removable storage media could be used. The storage device 2028 may allow access by the main unit 2002 for example to implement the methods described herein.

In examples, the communication module may comprise a wireless communication module 2048 and a wired communication module 2050. For example, the wireless communication module may be arranged to communicate wirelessly via a suitable wireless communication standard for example relating to wifi, Bluetooth, near field communication, optical communication (such as infrared), acoustic communication, or via a suitable mobile telecommunications standard. The wired communication module may allow communication via a wired or optical link for example by Ethernet or optical cable. However, it will be appreciated that any suitable communication module could be used.

Referring to FIGS. 2 to 9, the display, filtering, analysis or shooting module may for example be implemented by the processor. In examples, one or more of the display, filtering, analysis or shooting module may be implemented by the main unit 2002, although it will be appreciated that other suitable implementations could be used. In examples, the filtering, analysis or shooting module may be implemented by the main unit 2002 in cooperation with the output device 2024, although it will be appreciated that other suitable implementations could be used.

It will be appreciated that in examples of the disclosure, elements of the disclosed methods may be implemented in a computing device in any suitable manner. For example, a conventional computing device may be adapted to perform one or more of the methods described herein by programming/adapting one or more processors of the computing device. As such, in examples, the programming/adapting may be implemented in the form of a computer program product comprising computer implementable instructions stored on a data carrier and/or carried by a signal bearing medium, such as floppy disk, hard disk, optical disk, solid state drive, flash memory, programmable read only memory (PROM), random access memory (RAM), or any combination of these or other storage media or signal bearing medium, or transmitted via a network such as a wireless network, Ethernet, the internet, or any other combination of these or other networks.

In other words, in examples, a computer program may comprise computer readable instructions which, when implemented on a computing device, cause the computing device to carry out a method according examples of the disclosure. In examples, a storage medium may comprise the computer program, for example, as mentioned above. It will also be appreciated that other suitable computer architectures could be used such as those based on one or more parallel processors. Furthermore, at least some processing may be implemented on one or more graphical processing units (GPUs). Although computing device 2000 is described as a general purpose computing device, it will be appreciated that this could be implemented in any appropriate device, such as mobile phone, smart phone, camera, video camera, tablet device, server device, etc. . . . with modifications and/or adaptation if appropriate to the features described above, for example dependent on the desired functionality and hardware features.

The present image capturing method and related apparatus and system can be adopted in all the frameworks that consider the interaction between a user and an audio-visual stimulus developing an appropriate stimulus elaboration procedure, wherein each user could share the elaborated stimulus and its associated metadata (e.g. signals and extracted information) with any other person in order to compare the experiences and to understand the biological dynamics and reactions of the community.

For example, in the field of photography, integrating the present apparatus/system in a camera would produce a smart camera. In this way, it is possible to comprehend the path of visual exploration of a user before and during the photo shoot, identifying the biological response through the signals capture, their synchronization and analysis. The entire output data and respective extracted information could be stored and shared to understand and compare the cognitive process undergo a photo shoot. Furthermore, a smart camera could be accessorized with an upgraded AI system that is able to understand when to shoot automatically, using a computer learning algorithm nourished with selected previous experiences (e.g. shared or personal). In this case, the AI shoot system relies on the real-time metadata processed and recorded during the visualization into the viewfinder.

At a higher level of interpretation, without a specific application framework, it is possible to consider the sensors arrangement as a system that extracts additive stimulation information (metadata) with respect the stimulus visualization, generating a multidimensional features space associated to the stimulus fruition. Depending on the nature of the particular application field, the collection of a single augmented experience could be processed and then summarised in a communicative report, which consequently would change shape, content and purpose. This report could act as personal social communicator feeding a social network (e.g. an Instagram of the Neuroscience or as a scientific hub), where the associated metadata could be considered respectively as social information or knowledge discovery depending on the nature of the artistic of scientific stimuli.

Therefore, this wide sharing produces a recursive enrichment of the AI elaboration procedure, learning from the different augmented experiences. The upgraded AI algorithm would provide new and standalone platform with dedicated automated elaboration procedure. This is obtainable considering a specific cluster of experiences as learning set, generating new metadata starting with those generated by the users (metadata from metadata). Consequently, it is possible to profile each user using not only the information harvested from questionnaire, but taking advantage of their biological cognitive response.

The system transforms biological parameters in a new photographic language, which could communicate to third parties non-communicable signal extracted information.

Accordingly, another field of application can be the visual art seen as a much broader concept. For example, a user can that enjoy an image projected on a screen while different wearable sensors record its biological activity and response. The visual stimulus and the associated metadata can be elaborated generating sharable results. At a further level of development, it is possible to consider a museum accessorized with smart standalone and wearable non-invasive sensors that acquire the biological response of the users in response of a particular artwork fruition.

An advanced development would be to hyper-connect people with the reality creating an outdoor museum everywhere the user identify an artistic visual stimulation (i.e. augmented reality). Even in this case, the user could be dressed with appropriate wearable sensors, sensing clothes, smart glasses and using a smart phone that can acquire further biological signals it is possible to record different metadata associated to that particular visualization. All the information acquired could be processed and shared in a web community network.

Another scenario can be the elaboration of an audio-visual stimulus proposed to a patient for the neurocognitive assessment and rehabilitation. The output could be compared between different subjects in order to evaluate the possibility of cognitive disorder. Furthermore, it would be possible to generate an automated assessment keeping track of the previous user stimulations and using a dedicated AI algorithm.

Fashion represents a further area of application of the present method and the apparatus/system. For example, a user could visualize an image that represent himself dressed or made up according to his wishes. The biological reactions could be recorded in the form of signals and processed in order to elaborate a report that could be shared to the community in order to receive the other users' feedbacks. The upgraded AI processing would consist in the automatic purpose of the suit and made up configuration that, according to social and personal opinions, are good. The application in the fashion area suggests creating a new process of web based image searching, relying on the feeling of the user. In order to do this, it would be necessary to upgrade the AI algorithm in such a way that it find a correlation between the biological emotion response and the images that express that type of emotion.

As mentioned above, independently from the content and the nature of what is visualized by the user through the apparatus, it is possible to use the same image capturing method and the corresponding apparatus according at least to three different environments:
 1. Reality as it is. In other words, the observed reality;
 2. Augmented reality and/or mixed reality. In other words, the overlapping of virtual and digitalized (eventually in 3D) elements to the observed reality; and
 3. Virtual reality. In other words, creation of digital environments (usually in 3D) through software simulating observable environmental situations.

All these three configurations can be observed through a technological device (e.g., photographic camera, virtual headset, smart glasses, screen of a smartphone, etc.) able to project or reconstruct the environmental appearance.

It is worth to mention that employing to the present method, it is possible to carry out a traceability of the images. As a matter of fact, the triggered images are associated to metadata acquired by the user by means of the biological sensors. Both the metadata and the images, as well any type of their combination, represent a unique item.

Therefore, these can be intended as non-fungible tokens (NFTs). Also, the metadata registered during the employment of the apparatus can be stored for possible future re-elaboration of the acquired image flow.

In addition, by using the present method is possible to create a memory repository including the registered metadata collected during the application of the apparatus. The data can be used at a later time in the future for training new decisional models for a triggering shooting. The collected and stored data can also be used in the future for research purposes. As a matter of fact, the storing these data can generate a database of useful data associated to different users for conducting research.

According to an additional aspect, an apparatus and method for training a medical image diagnosis model is disclosed. In the following description, a number of specific details are presented in order to provide a thorough understanding of the examples of the disclosure. It will be apparent however to a person skilled in the art that these specific details need not be employed in order to practise the examples of the disclosure. Conversely, specific details known to the person skilled in the art are omitted for the purposes of clarity in presenting the examples.

Figure 12:
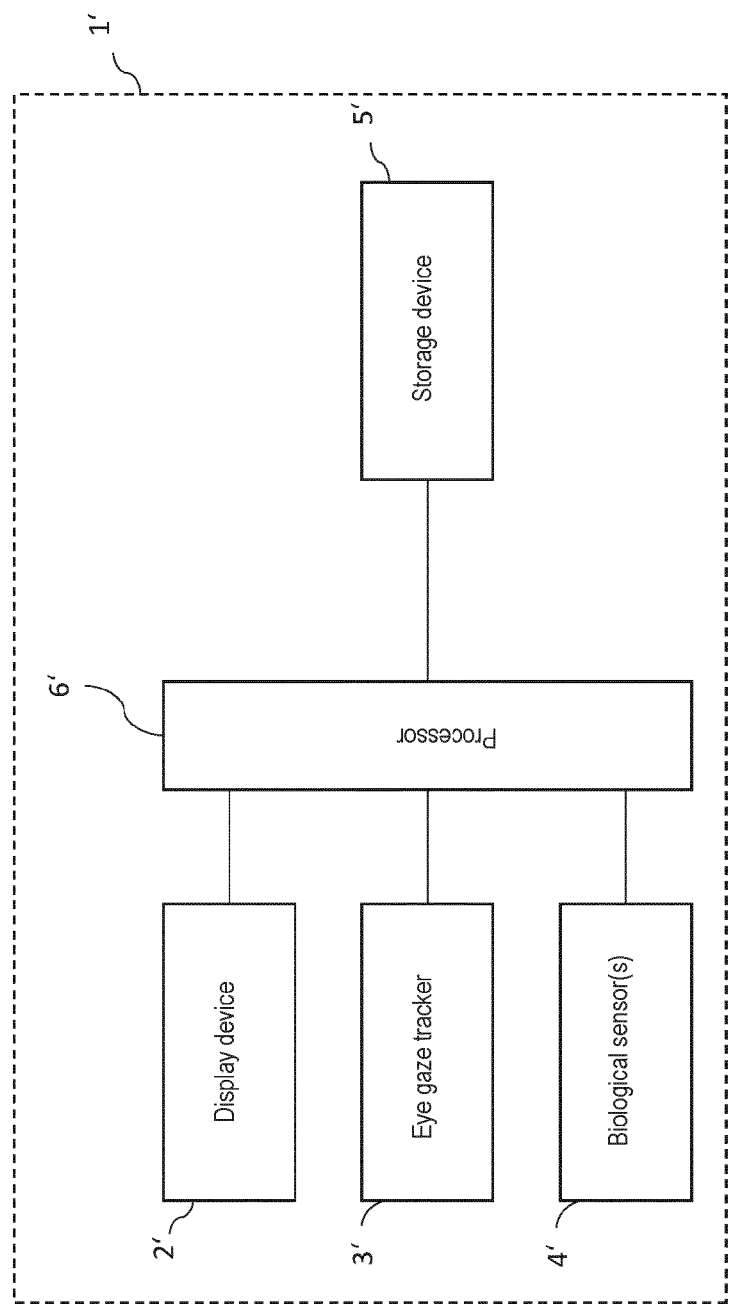
FIG. 12 shows a block diagram of the apparatus for training a medical image diagnosis model according to an example.

With reference to FIG. 12, an apparatus 1' for training a medical image diagnosis model is illustrated in the form of a block diagram. The apparatus 1' is based on a cognitive and visuo-spatial path generating model and comprises at least a display device 2', an eye gaze tracker 3', one or more biological sensors 4', and a storage device 5'.

The display device 2' is operable to display a medical image to be inspected for a medical condition by a user, wherein the medical image is associated with an image type. The eye gaze tracker 3' is operable to track the gaze of the user while viewing the medical image and performing a diagnosis of the medical condition associated with the medical image. The plurality of biological sensors 4' is operable to measure biological signals indicative of a neurophysiological reaction of the user while inspecting the medical image. The storage device 5' is operable to store diagnosis data indicative of a diagnosis of the medical condition associated with the medical image by the user, and to store the cognitive and visuo-spatial path generating model.

The display device 2', the eye-gaze tracker 3', the biological sensors 4' and the storage device 5' are all elements of the apparatus 1' connected to a processor 6' that receives and elaborates data from these elements for training the medical image diagnosis model.

Figure 13:
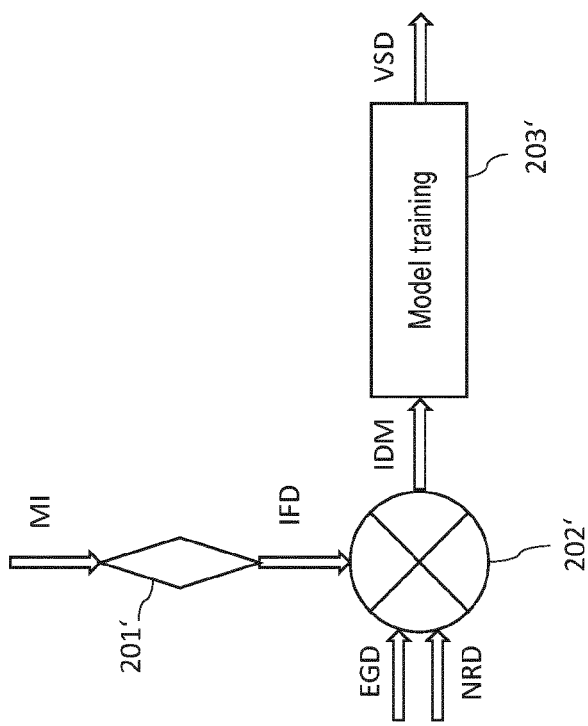
FIG. 13 shows a schematic representation of the data flow for the functioning of the processor according to an example.

The functioning of the processor 6' of FIG. 12 is better clarified in FIG. 13. According to this figure, at least a medical image (MI) is analysed to identify image features of the medical image that are from a set of image features associated with the image type of the medical image (MI). Consequently, image feature data (IFD) is generated by an image analysing module 201'. The image features as indicated by the image feature data (IFD) are then associated with the eye gaze data (EGD) and the neurophysical reaction data (NRD) generated by the eye gaze tracker 3' and the biological sensors 4', respectively. Consequently, image diagnosis metadata (IDM) is generated by an associating module 202'. The image diagnosis metadata (IDM) is used to train the cognitive and visuo-spatial path generating model to generate visuo-spatial cognitive path data (VSD) by a training module 203'. In particular, the visuo-spatial cognitive path data (VSD) defines a visuo-spatial path with respect to the medical image (MI) together with associated neurophysical reaction data (NRD) that is indicative of a significance attributed by the user to regions of the medical image (MI) when performing a diagnosis to arrive at a correct diagnosis.

Figure 14:
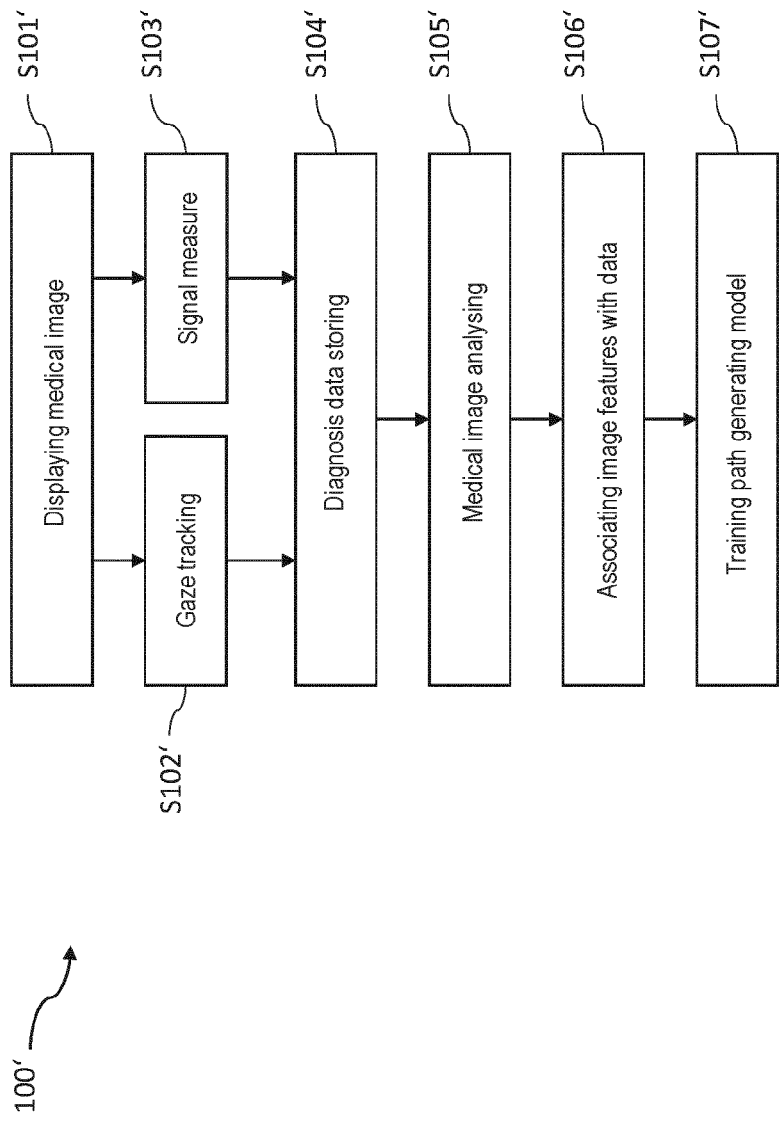
FIG. 14 shows a flowchart of the method for training a medical image diagnosis model according to an example.

FIG. 14 illustrates the steps of the method 100' for training a medical image diagnosis model that is based on a cognitive and visuo-spatial path generating model. At step S101', a medical image is displayed to be inspected for a medical condition by a user. The medical image can be associated with an image type, i.e. a X-ray image, an MRI image etc. At step S102', the gaze of the user is tracked and at step S103' biological signals indicative of a neurophysiological reaction of the user are measured. Both the steps S102' and S103' are carried out while the user is viewing the medical image and while the user is performing a diagnosis of the medical condition associated with the medical image. At step S104', diagnosis data indicative of the diagnosis of the medical condition associated with the medical image by the user, and the cognitive and visuo-spatial path generating model are stored in the storing device 5'. At step S105', the medical image is analysed to identify image features of the medical image that are from a set of image features associated with the image type of the medical image, so as to generate image feature data. At step S106', the image features as indicated by the image feature data are associated with the eye gaze data and the neurophysical reaction data so as to generate image diagnosis metadata. At step S107', the cognitive and visuo-spatial path generating model is trained to generate visuo-spatial cognitive path data. The training is carried out based on the image diagnosis metadata, in which the visuo-spatial cognitive path data defines a visuo-spatial path with respect to the medical image together with associated neurophysical reaction data that is indicative of a significance attributed by the user to regions of the medical image when performing a diagnosis to arrive at a correct diagnosis.

In one example, the method comprises displaying the medical image together with the visuo-spatial path generated by the cognitive and visuo-spatial path generating model.

The following signals could be acquired by the apparatus 1'. It is noted that the apparatus 1' can acquire only one or a combination of several signals:

GSR (galvanic skin response) signal
PPG (photoplethysmogram) signal
EEG (electroencephalography) signal
Facial Expression
ECG (electrocardiogram) signal
EMG (electromyography) signal
Pupil Diameter
Body Movement Language
Natural Spoken Language
Natural Emotional Language
fNIRS (functional near infrared spectroscopy) signal
Blood Oxygenation level
Biochemical parameters
Geo-localization signal All of these signals are considered as input metadata. The input data are used both to train the apparatus in order to generate different models corresponding to the reference visual-spatial-cognitive process built averaging diagnosis processes of different clinicians grouped in clusters, and to allow the users to auto-evaluate their own diagnosis process by accessing the model of its visual-spatial-cognitive exploration of the medical image (auto-awareness promoting function). In other words, the input data are biological signals extracted from the user biological activity while the user is inspecting and studying a medical image for diagnosis. The most important signal is the gaze position acquired through the use of an eye tracking system. Nevertheless, other signals extracted from different sensors could be used as system input data in order to increase the artificial intelligence efficiency.

In another example, the processor can be operable to process the medical image to map it to a predetermined graphical reference layout. Consequently, it is possible to set a common graphical reference system between images of the same nature.

According to an example, to further improve the performance of the apparatus, the storage device can be operable to store a plurality of medical reference images that are mapped to the predetermined graphical layout. Each medical reference image has associated reference image metadata which includes respective eye gaze data, neurophysical reaction data, and image feature data. In addition, the processor can be operable to compare the image diagnosis metadata with the reference image metadata of the medical reference images so as to train the visuo-spatial path generating model using machine learning.

Advantageously, in an example, the apparatus can be operable to receive the plurality of medical reference images together with their associated reference image metadata from a medical reference image database via a network. In particular, the apparatus can be operable to tune the cognitive and visuo-spatial path generating model when a new medical reference image with associated reference image metadata is added to the medical reference image database based on the new medical reference image and its associated reference image metadata.

In order to facilitate the determination of particular regions of the medial images, in one example, the image features can comprise one or more reference points, and/or one or more areas of interest.

In an additional example, the storage device can be operable to store user data that indicates information about the user, and the image diagnosis metadata includes the information about the user. In this way, it is possible to establish a direct link between the user and the diagnosis carried out on a particular medical image.

In another example, the processor can be operable to correlate the neurophysical reaction data with the eye gaze data to include into the image diagnosis metadata for training the cognitive and visuo-spatial path generating model.

In a further example, the display device can be operable to display the medical image together with the visuo-spatial path generated by the cognitive and visuo-spatial path generating model. In this way, the visuo-spatial path is immediately identifiable on the medical image on which a diagnosis is carried out.

The reaction of a clinician in front of the image is recorder in the form of biological activity and it is collected in a data-hub. For each clinician, different personal information is recorded for the purpose of clustering the reactions (specialization, age, years of experience, etc. . . . ). In this way, a network of clinicians could share information regarding the way of analysing a medical image. Furthermore, collecting different reactions, the apparatus 1' is configured to learn how to analyse efficiently a medical image, stressing not only the reference visual pathway for a good diagnosis but also underlying which details are more relevant for the purpose according to the cognitive reactions associated to the visual-spatial inspection. This entire "augmented" inspection of the image could be used to train new clinicians.

The collected and classified clinician reactions can be considered as statistical moderators. Once clustered, due to the fact that each reaction is associated to the respective diagnosis result formulated by the clinician, the AI system provides for each cluster the best visual-spatial-cognitive inspection pathways by averaging each reaction belonging to the single cluster for each image inspected. Then, the system is able to extend and generate the optimal visual-spatial-cognitive inspection pathways for a new image (i.e. an image that has never been inspected for diagnosing by a clinician). In order to evaluate the efficiency and to build a useful system, the AI is trained using a training and validation dataset partitioning logic. The comparison between the visual-spatial-cognitive process of the user and the one reconstructed from other clinicians belonging to a specific cluster allows a knowledge transfer that conveys efficient reasoning process in new clinicians resulting in diagnosis that is more precise.

As mentioned above, the apparatus 1' is based on artificial intelligence and developed through a consequential logic of data collection (i.e. recordings) to be used to train a model and tuning the parameters of the model in order to obtain a satisfactory result in terms of performance. The generated model can be used to produce new results and then forecast an output. In this particular framework, the generation of a specific output is intended as the generation of a specific visuo-spatial cognitive path focused on identifying the following:

a. the portions of the image that are most significant in an inspection in order to arrive at a correct diagnosis;
b. the temporal sequence how these portions are inspected; and
c. the "weight" attributed to each of these portions.

In this case, different configurations of the model can be developed based on the different clusters identified among the moderators of the individual registrations (e.g. years of experience, specialization, number of diagnoses processed etc.). As mentioned above, in examples, the user data can indicate information about the user, and the image diagnosis metadata can include the information about the user.

Figure 15:
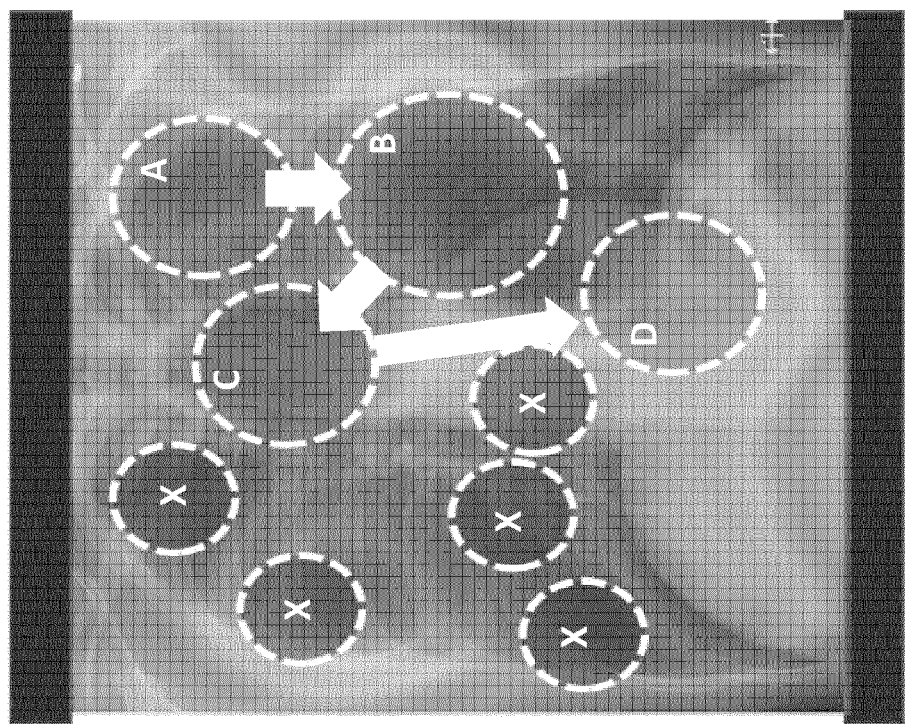
FIG. 15 shows a an example of the most significant portions identified on a heat map image.

An example is illustrated in FIG. 15, in which a heat map 10' of an X-ray thorax image of a patient is shown. The most significant portions of the image (A, B, C, and D) are identified on the right side, for example with a particular colour. The not observed areas of the image (X) are located on the left side and are identified for example with a different colour. Also, the temporal sequence of observation can be identified through a series of arrows and the weight attributed to each portion can be identified with a larger or smaller area. According to the image of FIG. 15, in order to achieve the diagnosis, the user basically concentrated exclusively on the right side of the image. In particular, the user inspected four portions (A-D) starting from the upper left corner (A) of the image and ending on the lower region (D) of the image following a precise visual path, i.e. from A to B, from B to C and from C to D. It is noted that the most relevant portion can be the portion B since having a larger area compared to the other portions. For example, the user could have dedicated a longer period of time in inspecting this portion B or a particular biological signal could have indicated that the user experienced a particular feeling during the inspection of portion B, for example by measuring the heartbeat or the pupil diameter. Accordingly, the inspection of this portion can be considered most likely fundamental to achieve the final diagnosis. In other words, in one example, the visuo-spatial cognitive path data can comprise significance data indicative of an importance of areas of the medical image corresponding to the one or more of the image features in arriving at the correct diagnosis. The significance data can indicate for example the importance of the areas e.g. dwell time of gaze on a particular area, number of returns of gaze to a particular area, etc. In a further example, the visuo-spatial cognitive path data can comprise temporal order data indicating an order in which areas of the medical image corresponding to the image features were inspected by the user. It this way, it is possible to determine a sequence of inspected area before reaching a diagnosis.

The single recording consists of the biological signals collected during the display of a medical image, the personal information of the subject (i.e. moderators), the diagnosis, and the image and type (e.g. pulmonary x-ray, abdominal ultrasound, blood test, etc. . . . ) of the image. In a model training and building phase, the algorithm can be fed with the different recordings belonging to a specific cluster identified between the moderators and the type of image.

As an example, a training dataset can consist of several recordings belonging to radiologists with over 20 years of experience who have viewed pulmonary X-ray images. In a first step, an image recognition system identifies some reference points (e.g. carina) as well as dividing the image into areas of interest (AOI) for example through image reticulation. In other words, for example, the image features can comprise one or more reference points, and/or one or more areas of interest. Features are defined for each AOI of the image based on the graphical information content, for example, morphological localization and grey-scale mean value. For each AOI, different indices based on biological signals can be calculated, such as the fixation time, the number of fixations, the level of attention, the stress level, the spatial distance between the AOI and the distance displayed in the previous fixation.

Having therefore imposed a common graphical reference system between images of the same nature (i.e. pulmonary X-ray), it is possible to compare the recordings with each other by creating an adequate dataset for the training of the model. In other words, as mentioned above, in examples the medical images may be processed to map them to a predetermined graphical reference layout. In this way, the result obtained can be considered as an average of the individual recordings and therefore of the individual visual-spatial cognitive processes.

Once the general and point characteristics of each AOI are defined, a network of probabilities can be calculated from which it is possible to determine a sort of sequence of AOI—and corresponding significance (i.e. weight for each AOI)—a pulmonary X-ray image would be observed by a radiologist-type person with more than 20 years of experience. This network, similar to a Markov stochastic process, therefore consists of several system states that are represented by the AOI and the probability of state transition, which also consider past transitions. To quantify individual transition probabilities, a multinomial Random Forest can be used for each AOI. In this perspective, the space of the multinomial target variable consists of the different AOls of the image, while the space of the predictors is formed by the indices (i.e. features) calculated for the particular AOI in which the system is located (i.e. current state of the system). To these features, in addition to the signal features, indices can be added that summarize the cognitive and visual path put in place until the current AOI is displayed. In other words, as mentioned above, in examples, the image diagnosis metadata is compared with the reference image metadata of the medical reference images so as to train the visuo-spatial path generating model using machine learning.

The configuration of the model thus generated is able to:
receive a new pulmonary X-ray image, i.e. never analyzed in the training database;
identify some landmarks for graphical analysis;
split the image into AOI of appropriate measure;
give each AOI its own graphic characteristics; and
return the visual-spatial cognitive process that best identifies image inspection by a radiologist with 20 years of experience, attributing to each AOI, not only the viewing time position but also the degree of interest for a correct diagnosis.

The apparatus 1' aims to study, modelling, reproduce and then convert human cognitive behaviour or process into artificial intelligence through the analysis of the process of visualization of a medical image and/or report by a clinician (e.g. CT, MRI, blood test, etc. . . . ). Instead of simply developing a system capable of automatically diagnosing a pathological state independently through previous training on an image database, the aim of the present apparatus 1' is to generate an artificial intelligence module that is able to identify and model the cognitive-visual-spatial patterns of the clinician effective for the image and/or report observation and therefore for the descending a diagnosis.

Using different sensors (eye-tracking, gsr, ppg, eeg, etc. . . . ), it is possible to study the cognitive process underlying the image exploration. This is done extracting and acquiring biological signals, objectifying neurophysiological reactions, and measuring in real-time mode the attention given to each area of the same image. By collecting and clustering the different acquisitions according to different stratification parameters (moderators/dummy variables; e.g. medical experience, specialty, etc. . . . ), it is possible to generate one or more models by identifying the best practice and knowledge for each cluster. The algorithms developed with the present method 100' promote a new type of learning no longer based on the result but on the human cognitive process used to achieve the result itself. In fact, one of the main scopes in using the present method and apparatus is to reduce the human error caused by a bad-practice often undetected, by analysing the performance and not simply the result.

In other words, the apparatus or a platform using the apparatus, learns from humans and evinces the best of their visual reasoning, i.e. which patterns, which paths, which points of attention have been effective for the success of the diagnosis.

In this way, it is possible to achieve a personalized training scheme for a user being trained, identifying specific learning clusters including all the users, wherein an AI system supports the user by highlighting what are the typical cluster errors and possibly the visual reasoning errors of the user himself. In other words, it is possible to make the user aware of the own processes to make a diagnosis. By transforming a analogic cognitive process into a digital and repeatable process, it is possible to develop an augmented natural intelligence system based on self-awareness. In addition, data are used to train artificial intelligence model with a natural machine-human interface that interpret the vision-based cognitive processes as inputs to decision-making. The target data to analyse are not the results achieved but rather the processes carried out to achieve said results.

Figure 16:
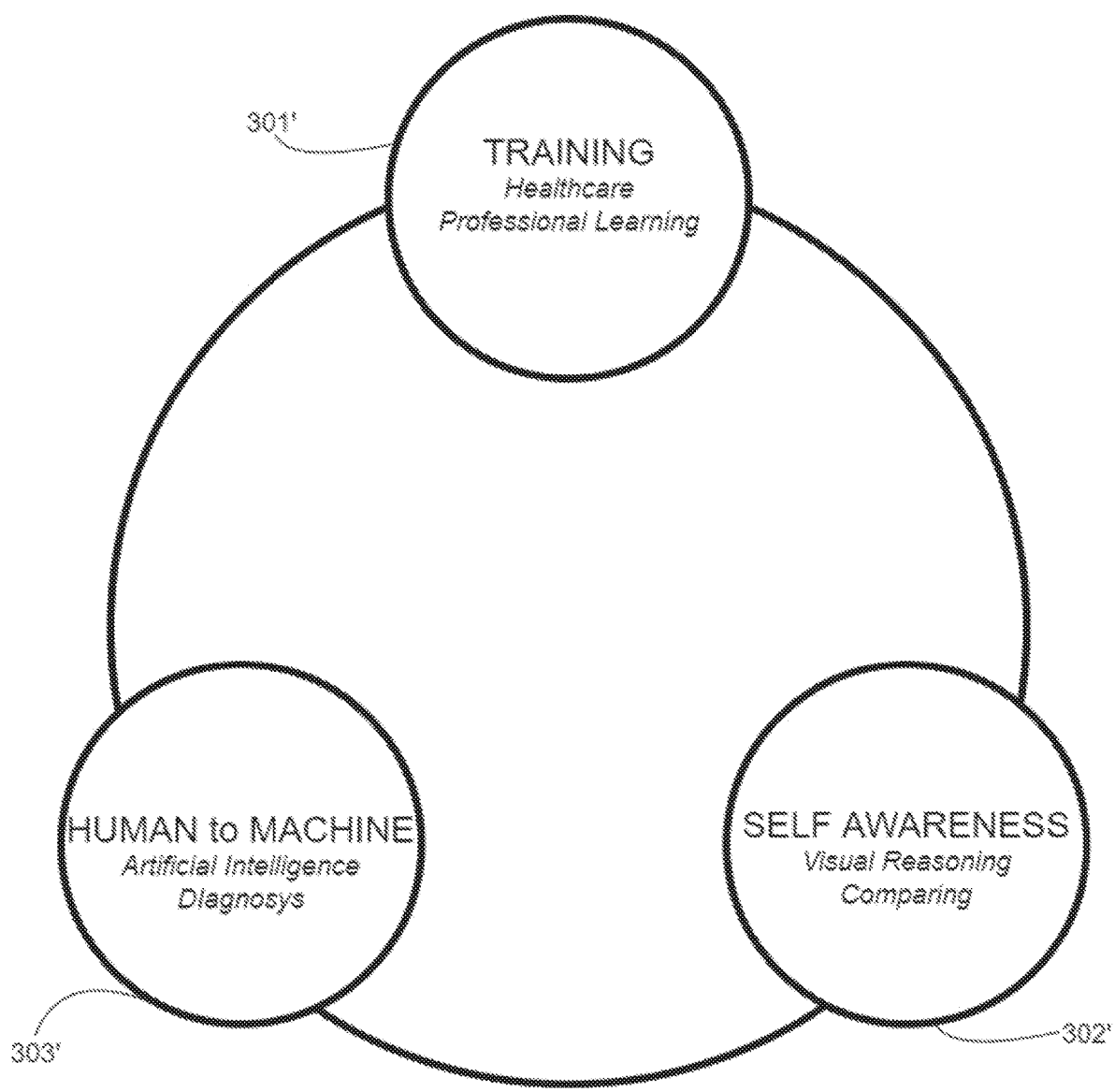
FIG. 16 shows a schematic representation of the three levels of application of the apparatus according to an example.

Accordingly, as shown in FIG. 16, three levels of application can be identified: training 301', self-awareness 302', and human to machine learning 303'.

1) TRAINING—Healthcare Professional Learning

In this first application area 301', the trained apparatus can be used for educational purposes and knowledge transfer among professionals in the field. A novice clinician can learn the cognitive-visual-spatial strategies put in place by more experienced colleagues to analyse a medical image. This can happen through the objectivity of cognitive and biological data until now not considered for knowledge transfer.

In other words, it is as if the consciousness of a novice clinician is entirely projected into the body of a clinical model for the time it takes to learn and formulate the diagnosis.

2) SELF AWARENESS—Visual Reasoning Comparing

In this second application area 302', it is possible to inform the clinician user of their own cognitive-visual-spatial process to achieve diagnosis, promoting an increase in self-awareness of such processes.

3) HUMAN TO MACHINE LEARNING—Artificial Intelligence Reporting

In this third application area 303', the collection of the different cognitive-biological signals underlying the clinical image inspection process can be used to develop artificial intelligence models by increasing the effectiveness and accuracy of those using only related diagnostic results. Accordingly, a machine performing diagnostic actions can be created based on sequential decision learning algorithms.

Figure 17:
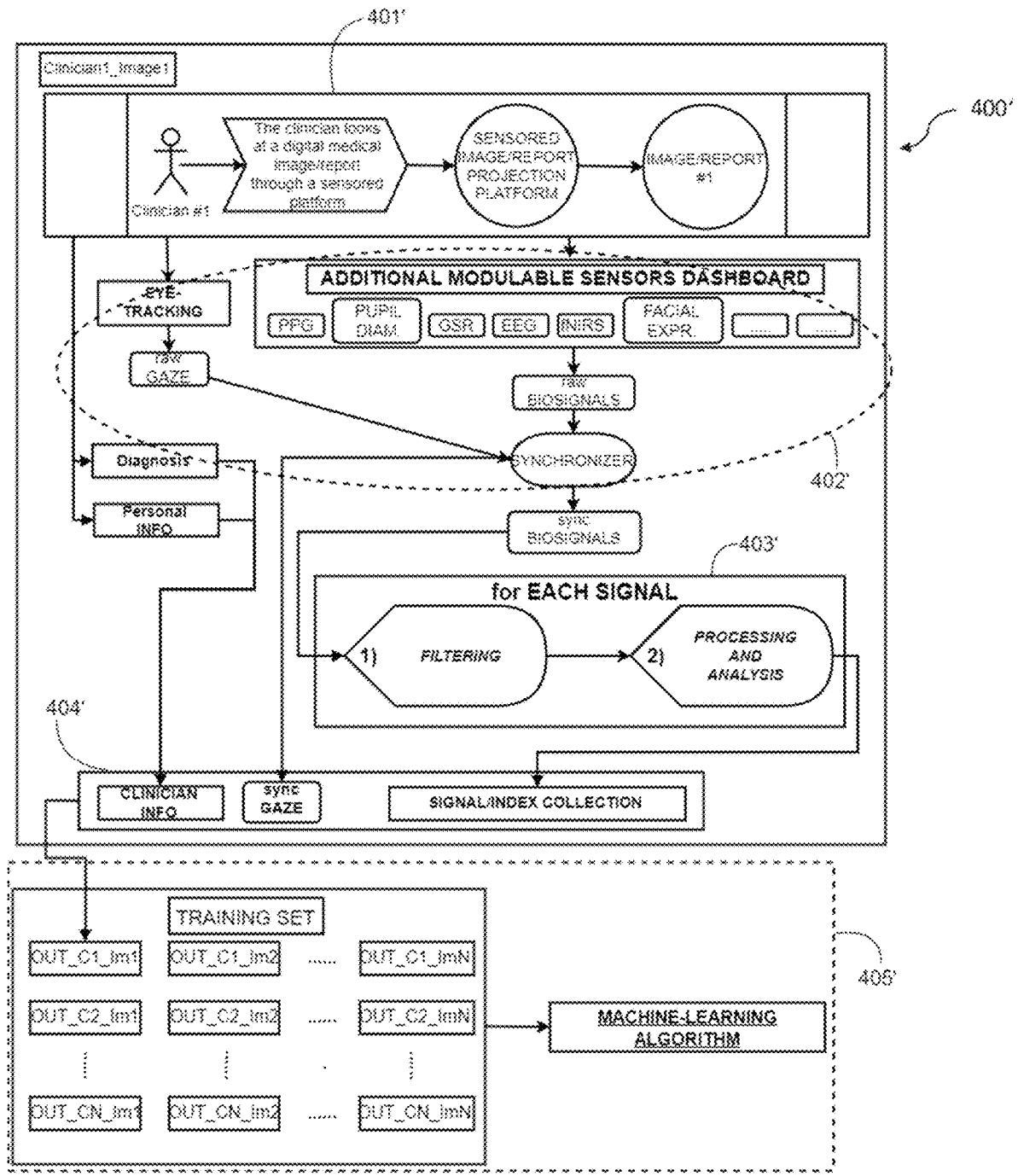
FIG. 17 shows a flowchart of the information collection for training a medical image diagnosis model according to an example.

FIG. 17 schematically illustrates an example of the process 400', wherein a user (clinician #1) observes a medical image and/or report through a platform provided with different sensors 401'. A diagnosis on the image and a corresponding report (#1) is obtained while the user is "observed" by the sensors including eye tracking and additional biological sensors. From this process of "sensor observation", the dashboard of sensors extracts different types of signals of raw quality (i.e. as they are collected) that are synchronized both with each other and with the gaze signals, in order to have a unique correspondence between each timestamp and information recorded during the course of the process 402'. According to this example, a plurality of biological sensors are utilised, such as GSR, PPG, pupil diameter, EEG, fNIRS, facial expression, or other appropriate sensors.

Signals obtained from the synchronization process go through a two stage data processing step 403'. Each signal is filtered with appropriate and personalized techniques aimed at reducing typical signal noise or due to human artefacts. These filtered signals undergo numerical analysis techniques for extracting indices and signals that represent trends or figures of merit explanatory of the cognitive and emotional state of the user. In particular, while the system is continuously acquiring signals from the different sensors, the integrated software system filters and analyses the signals. The analysis consists in the automatic research of a specific pattern in the values of the signals. Furthermore in the digital file all physiological metadata recorded are saved (such as in "raw" format, e.g. data output by the respective sensors) together with clinician information (user data, and user metadata such as diagnosis and personal information) 404'. Once extracted, the signal outputs are ready to be used to train the cognitive and visuo-spatial path generating model in a Machine Learning (ML) system 405'. This system receives incoming outputs of the filtering, processing and analysis phase and, based on the clinician information and the gaze signals, generates visuo-spatial cognitive path data defining a visuo-spatial path with respect to the medical image together with associated neurophysical reaction data that is indicative of a significance attributed by the clinician to regions of the medical image when performing a diagnosis to arrive at a correct diagnosis.

Figure 18:
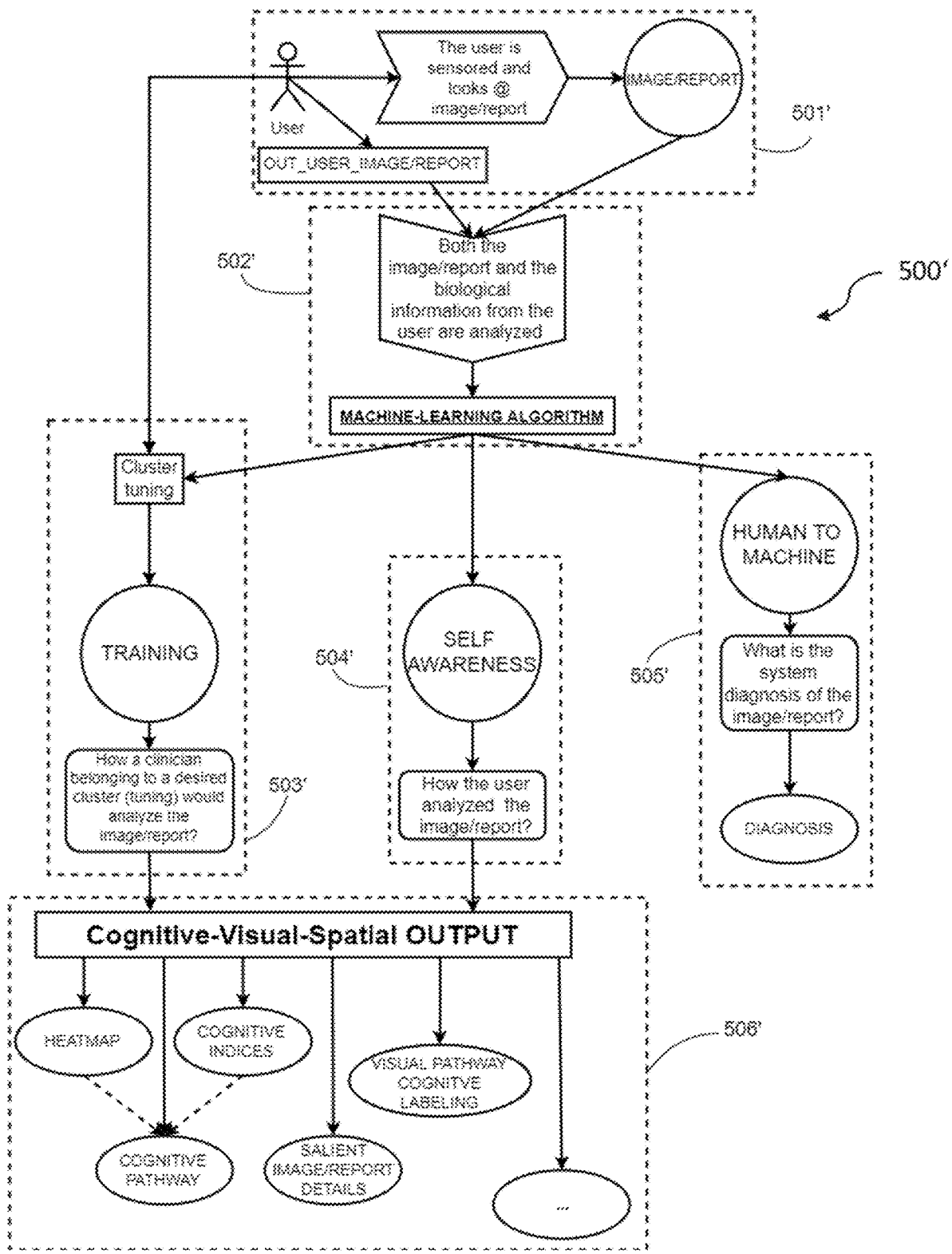
FIG. 18 shows a schematic representation of the employment of the apparatus for training a medical image diagnosis model according to an example.

FIG. 18 schematically illustrates the use 500' of the present apparatus 1'. The user observes a medical image and the biological activity is detected through a plurality of sensors 501'. Both the image or report and the biological information from the user are analysed and used in a machine learning algorithm 502'. Based on this, three possible applications can be followed, i.e. a training implementation 503', a self-awareness 504' implementation, and a human to machine learning implementation 505'. In the training implementation 503' (together with a cluster tuning), it is considered how a clinician belonging to a desired cluster would analyse the image or report inspected by the user. Accordingly, cognitive visuo-spatial output (e.g. heat map, cognitive pathway, cognitive indices, salient image or report details, visual pathway cognitive labelling, etc.) is determined 506'. In the self-awareness implementation 504', it is considered how the user analysed the image or report. Also in this case, cognitive visuo-spatial output (e.g. heat map, cognitive pathway, cognitive indices, salient image or report details, visual pathway cognitive labelling, etc.) is determined 506'. In the human to machine learning implementation 505', it is considered what is the system diagnosis of the inspected image or report. Accordingly, a corresponding diagnosis can be determined.

Figure 19:
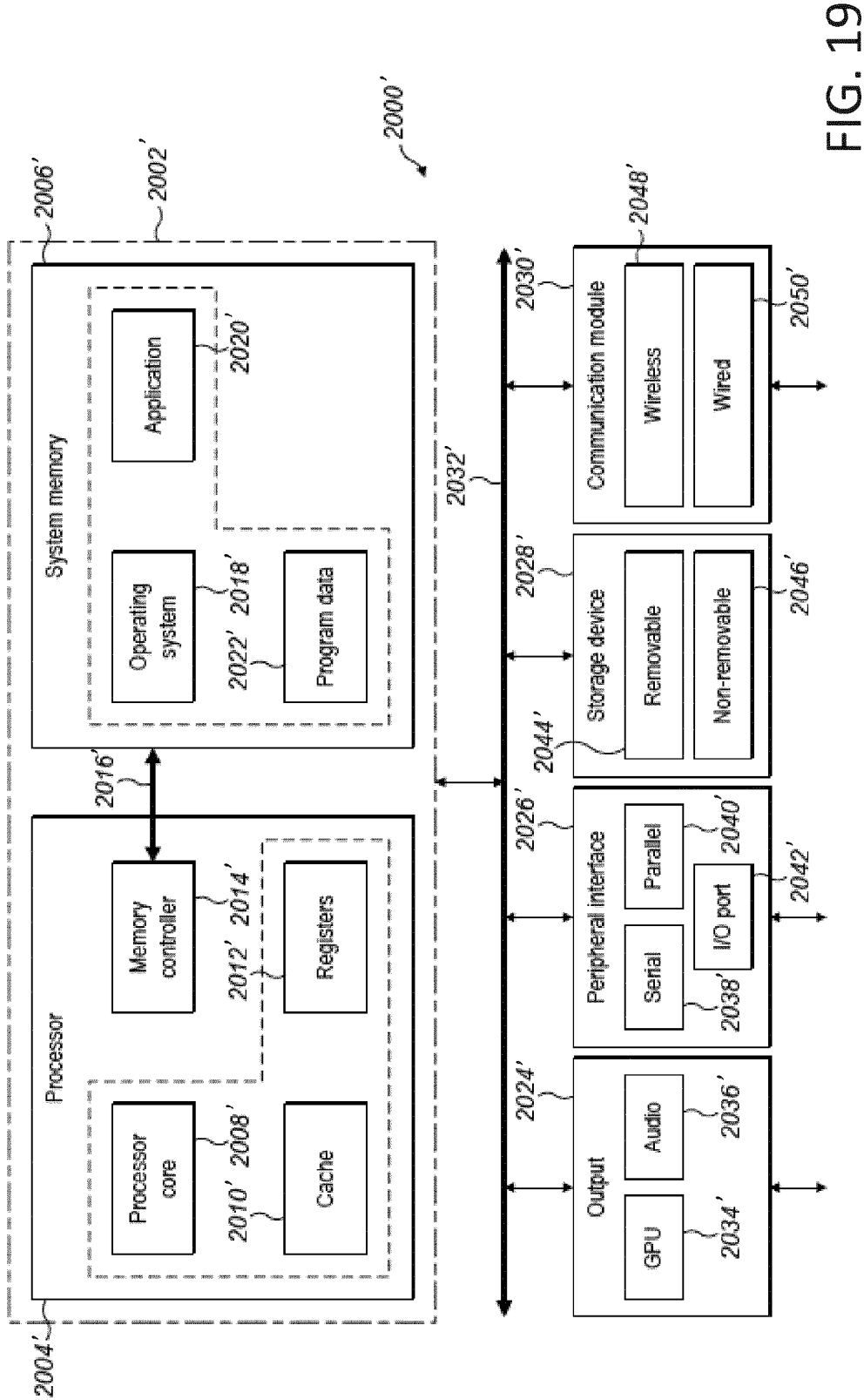
FIG. 19 shows a schematic representation of a computer system.

FIG. 19 schematically shows a computer system for implementing methods and techniques of examples of the disclosure. In particular, FIG. 19 shows an example of a computing device 2000' for example which may be arranged to implement one or more of the examples of the methods described herein. In examples, the computing device 2000' comprises main unit 2002'. The main unit 2002' may comprise a processor 2004' and a system memory 2006'. In examples, the processor 2004' may comprise a processor core 2008', a cache 2010', and one or more registers 2012'. In examples, the processor core 2008' may comprise one or more processing cores and may comprise a plurality of cores which may run a plurality of threads. The processor 2004' may be of any suitable type such as microcontroller, microprocessor, digital signal processor or a combination of these, although it will be appreciated that other types of processor may be used.

In examples, the processor core 2008' may comprise one or more processing units. In examples, the processor core 2008' comprises one or more of a floating point unit, an arithmetic unit, a digital signal processing unit, or a combination of these and/or plurality of other processing units, although it will be appreciated that other processing units could be used. In examples, the cache 2010' may comprise a plurality of caches such as a level one cache and a level two cache, although other appropriate cache arrangements could be used.

In examples, the processor 2004' comprises a memory controller 2014' operable to allow communication between the processor 2004' and the system memory 2006' via a memory bus 2016'. The memory controller 2014' may be implemented as an integral part of the processor 2004', or it may be implemented as separate component.

In examples, the system memory 2006' may be of any suitable type such as non-volatile memory (e.g. flash memory or read only memory), volatile memory (such as random access memory (RAM)), and/or a combination of volatile and non-volatile memory. In examples, the system memory 2006' may be arranged to store code for execution by the processor 2004' and/or data related to the execution. For example, the system memory may store operating system code 2018', application code 2020', and program data 2022'. In examples, the application code 2020' may comprise code to implement one or more of the example methods described herein, for examples to implement the steps described above with reference to FIGS. 14, 17 and 18. The application code 2020' may be arranged to cooperate with the program data 2022' or other media for example to allow the train of the cognitive and visuo-spatial path generating model.

In examples, the computing device 2000' may have additional features, functionality or interfaces. For example main unit 2002' may cooperate with one or more peripheral devices for example to implement the methods described herein. In examples, the computing device 2000' comprises, as peripheral devices, an output interface 2024', a peripheral interface 2026', a storage device 208', and a communication module 2030'. In examples, the computing device comprises an interface bus 2032' arranged to facilitate communication between the main unit 2002' and the peripheral devices.

In examples, the output device 2024' may comprise output devices such as a graphical processing unit (GPU) 2034' and audio output unit 2036' for example arranged to be able to communicate with external devices such as a display, and/or loudspeaker, via one or more suitable ports such as audio/video (A/V) port. In examples, the peripheral interface 2026' may comprise a serial interface 2038', a parallel interface 2040', and a input/output port(s) 2042' which may be operable to cooperate with the main unit 2002' to allow communication with one or more external input and/or output devices via the I/O port 2042'. For example, the I/O port 2042' may communication with one or more input devices such as a keyboard, mouse, touch pad, voice input device, scanner, imaging capturing device, video camera, and the like, and/or with one or more output devices such as a 2D printer (e.g. paper printer), or 3D printer, or other suitable output device. For example, signals may be received via the I/O port 2042' and/or the communication module 2030'.

In examples, the storage device may comprise removable storage media 2044' and/or non-removable storage media 2046'. For example, the removable storage media may be random access memory (RAM), electrically erasable programmable read only memory (EEPROM), read only memory (ROM) flash memory, or other memory technology, optical storage media such as compact disc (CD) digital versatile disc (DVD) or other optical storage media, magnetic storage media such as floppy disc, magnetic tape, or other magnetic storage media. However, it will be appreciated that any suitable type of removable storage media could be used. Non-removable storage media 2046' may comprise a magnetic storage media such as a hard disk drive, or solid state hard drive, or other suitable media, although it will be appreciated that any suitable non-removable storage media could be used. The storage device 2028' may allow access by the main unit 2002' for example to implement the methods described herein.

In examples, the communication module may comprise a wireless communication module 2048' and a wired communication module 2050'. For example, the wireless communication module may be arranged to communicate wirelessly via a suitable wireless communication standard for example relating to wifi, Bluetooth, near field communication, optical communication (such as infrared), acoustic communication, or via a suitable mobile telecommunications standard. The wired communication module may allow communication via a wired or optical link for example by Ethernet or optical cable. However, it will be appreciated that any suitable communication module could be used.

Referring to FIGS. 12 to 18, the training module or the analysis module may for example be implemented by the processor. In examples, one or more of the training and/or analysis module may be implemented by the main unit 2002', although it will be appreciated that other suitable implementations could be used. In examples, the training or analysis module may be implemented by the main unit 2002' in cooperation with the output device 2024', although it will be appreciated that other suitable implementations could be used.

It will be appreciated that in examples of the disclosure, elements of the disclosed methods may be implemented in a computing device in any suitable manner. For example, a conventional computing device may be adapted to perform one or more of the methods described herein by programming/adapting one or more processors of the computing device. As such, in examples, the programming/adapting may be implemented in the form of a computer program product comprising computer implementable instructions stored on a data carrier and/or carried by a signal bearing medium, such as floppy disk, hard disk, optical disk, solid state drive, flash memory, programmable read only memory (PROM), random access memory (RAM), or any combination of these or other storage media or signal bearing medium, or transmitted via a network such as a wireless network, Ethernet, the internet, or any other combination of these or other networks.

In other words, in examples, a computer program may comprise computer readable instructions which, when implemented on a computing device, cause the computing device to carry out a method according examples of the disclosure. In examples, a storage medium may comprise the computer program, for example, as mentioned above. It will also be appreciated that other suitable computer architectures could be used such as those based on one or more parallel processors. Furthermore, at least some processing may be implemented on one or more graphical processing units (GPUs). Although computing device 2000' is described as a general purpose computing device, it will be appreciated that this could be implemented in any appropriate device, such as mobile phone, smart phone, camera, video camera, tablet device, server device, etc. . . . with modifications and/or adaptation if appropriate to the features described above, for example dependent on the desired functionality and hardware features.

The present apparatus 1' and method 100' basically find application in the medical image diagnostic framework. For example, a clinician looking at a digitalized medical image can produce a modified image enriched with its biological signals and information. Then, this elaboration can be shared between different colleagues in order to highlight and understand the weight associated to each visualization instant area depending on the signal recorded (e.g. heat map). The collection of the different visualizations can be used to train an algorithm (e.g. AI algorithm) supporting the image exploration of the clinician and reporting a further interpretation of the stimulus, automatically adding knowledge extracted from other users (e.g. a medical images support decision system). In the same context, it is possible to use medical records displayed on the screen instead of the digitalized medical image as visual stimulus. For example, the system can register which information contained in the record has been observed for a longer time and with higher attention. In another scenario, the present apparatus 1' and method 100' can be used for the elaboration of an audio-visual stimulus proposed to a patient for the neurocognitive assessment and rehabilitation. The output can be compared between different subjects in order to evaluate the possibility of cognitive disorder. Furthermore, it is possible to generate an automated assessment keeping track of the previous user stimulations and using a dedicated AI algorithm, for example based on the cognitive and visuo-spatial path generating model, and/or the medical image diagnosis model.

The present apparatus 1' and method 100' are defined according to the following clauses.

Clause 1. An apparatus (1') for training a medical image diagnosis model that is based on a cognitive and visuo-spatial path generating model, the apparatus (1') comprising:
- a display device (2') operable to display a medical image to be inspected for a medical condition by a user, the medical image being associated with an image type;
- an eye gaze tracker (3') operable to track the gaze of the user as they view the medical image while performing a diagnosis of the medical condition associated with the medical image, so as to generate eye gaze data;
- one or more biological sensors (4') operable to measure biological signals indicative of a neurophysiological reaction of the user as they inspect the medical image, so as to generate neurophysical reaction data;
- a storage device (5') operable to store diagnosis data indicative of a diagnosis of the medical condition associated with the medical image by the user, and to store the cognitive and visuo-spatial path generating model; and
- a processor (6') operable to:
  - analyse the medical image to identify image features of the medical image that are from a set of image features associated with the image type of the medical image, so as to generate image feature data;
  - associate the image features as indicated by the image feature data with the eye gaze data and the neurophysical reaction data so as to generate image diagnosis metadata; and
  - train the cognitive and visuo-spatial path generating model to generate visuo-spatial cognitive path data based on the image diagnosis metadata, in which the visuo-spatial cognitive path data defines a visuo-spatial path with respect to the medical image together with associated neurophysical reaction data that is indicative of a significance attributed by the user to regions of the medical image when performing a diagnosis to arrive at a correct diagnosis.

Clause 2. An apparatus (1') according to clause 1, in which the visuo-spatial cognitive path data comprises significance data indicative of an importance of areas of the medical image corresponding to the one or more of the image features in arriving at the correct diagnosis.

Clause 3. An apparatus (1') according to clause 1 or clause 2, in which the visuo-spatial cognitive path data comprises temporal order data indicating an order in which areas of the medical image corresponding to the image features were inspected by the user.

Clause 4. An apparatus (1') according to any preceding clauses, in which the processor (6') is operable to process the medical image to map it to a predetermined graphical reference layout.

Clause 5. An apparatus (1') according to clause 4, in which:
- the storage device (5') is operable to store a plurality of medical reference images that are mapped to the predetermined graphical layout, each medical reference image having associated reference image metadata which includes respective eye gaze data, neurophysical reaction data, and image feature data; and
- the processor (6') is operable to compare the image diagnosis metadata with the reference image metadata of the medical reference images so as to train the visuo-spatial path generating model using machine learning.

Clause 6. An apparatus (1') according to clause 5, in which the apparatus (1') is operable to receive the plurality of medical reference images together with their associated reference image metadata from a medical reference image database via a network.

Clause 7. An apparatus (1') according to clause 6, in which the apparatus (1') is operable to tune the cognitive and visuo-spatial path generating model when a new medical reference image with associated reference image metadata is added to the medical reference image database based on the new medical reference image and its associated reference image metadata.

Clause 8. An apparatus (1') according to any preceding clause, in which the image features comprises one or more reference points, and/or one or more areas of interest.

Clause 9. An apparatus (1') according to any preceding clause, in which the storage device (5') is operable to store user data that indicates information about the user, and the image diagnosis metadata includes the information about the user.

Clause 10. An apparatus (1') according to any preceding claim, in which the processor (6') is operable to correlate the neurophysical reaction data with the eye gaze data to include into the image diagnosis metadata for training the cognitive and visuo-spatial path generating model.

Clause 11. An apparatus (1') according to any preceding claim, in which the display device (2') is operable to display the medical image together with the visuo-spatial path generated by the cognitive and visuo-spatial path generating model.

Clause 12. A method (100') for training a medical image diagnosis model that is based on a cognitive and visuo-spatial path generating model, the method comprising:
- displaying (S101'), on a display device (2'), a medical image to be inspected for a medical condition by a user, the medical image being associated with an image type;
- tracking (S102'), using an eye gaze tracker (3'), the gaze of the user as they view the medical image while performing a diagnosis of the medical condition associated with the medical image, so as to generate eye gaze data;
- measuring (S103'), using one of more biological sensors (4'), biological signals indicative of a neurophysiological reaction of the user as they inspect the medical image, so as to generate neurophysical reaction data;
- storing (S104'), using a storage device (5'), diagnosis data indicative of the diagnosis of the medical condition associated with the medical image by the user, and the cognitive and visuo-spatial path generating model;
- analysing (S105'), by a processor (6'), the medical image to identify image features of the medical image that are from a set of image features associated with the image type of the medical image, so as to generate image feature data;
- associating (S106'), by the processor (6'), the image features as indicated by the image feature data with the eye gaze data and the neurophysical reaction data so as to generate image diagnosis metadata; and
- training (S107'), using the processor (6'), the cognitive and visuo-spatial path generating model to generate visuo-spatial cognitive path data based on the image diagnosis metadata, in which the visuo-spatial cognitive path data defines a visuo-spatial path with respect to the medical image together with associated neurophysical reaction data that is indicative of a significance attributed by the user to regions of the medical image when performing a diagnosis to arrive at a correct diagnosis.

Clause 13. A method (100') according to clause 12, comprising displaying the medical image together with the visuo-spatial path generated by the cognitive and visuo-spatial path generating model.

Clause 14. A computer program comprising computer readable instructions which, when implemented on a computer, causes the computer to carry out a method according to clause 12 or clause 13.

Clause 15. A storage medium comprising the computer program according to clause 14.

Although a variety of techniques and examples of such techniques have been described herein, these are provided by way of example only and many variations and modifications on such examples will be apparent to the skilled person and fall within the spirit and scope of the present invention, which is defined by the appended claims and their equivalents.

The invention claimed is:

1. An image capturing method using an image capturing apparatus that comprises an imaging device having an image catcher for generating image data, the method comprising:
   displaying images, using an image reproducing device, the images based on the image data;
   generating attribute data from a plurality of biological signals measured by a plurality of biological sensors, the attribute data being information extracted by one or more biological signals through a computational processing and being indicative of attributes of a user at a time that the user is viewing the images displayed by the image reproducing device;
   generating significance data based on the attribute data, and associating the attribute data from which the significance data is generated with each displayed image, wherein the significance data are generated by comparing the attribute data with predetermined significance threshold values in order to identify a significance state for each attribute data;
   controlling photographic parameters of the image capturing apparatus based on the attribute data, wherein controlling the photographic parameters comprises a variation of said photographic parameters as a function of a variation of at least one biological signal;
   analysing the significance data to determine if the displayed images should be stored, wherein analysing the significance data comprises generating a significance level from the significance data and comparing said significance level with a triggering threshold level; and
   storing the image data of the displayed images together with the attribute data to a storage device based on the analysed significance data.

2. The image capturing method according to claim 1, wherein:
   the significance data comprises a plurality of significance levels, each associated with a respective biological signal from which the attribute data was generated;
   analysing the significance data comprises generating a combined significance level based on the significance levels for each of the biological signals; and
   storing the image data together with the attribute data comprises storing the displayed images to the storage device together with the attribute data based on a comparison of the combined significance level with a triggering threshold level.

3. The image capturing method according to claim 1, wherein generating the significance data and analysing the significance data is based on a predetermined shooting model.

4. The image capturing method according to claim 3, wherein the predetermined shooting model is generated based on biological signals acquired from a user or a plurality of users when viewing a set of model training images for training the predetermined shooting model.

5. The image capturing method according to claim 3, wherein the triggering threshold level is determined according to the predetermined shooting model.

6. The image capturing method according to claim 3, further comprising transmitting the image data of the displayed images together with their associated local biological signals to a shooting model database for tuning the predetermined shooting model.

7. The image capturing method according to claim 1, wherein the user is a local user that is local to the image capturing apparatus, and the attribute data comprises local attribute data that is associated with a time that the local user is viewing the images displayed by the image reproducing device.

8. The image capturing method according to claim 1, wherein the user is a remote user that is remote to the image capturing apparatus, the image reproducing device is local to the remote user, and the attribute data comprises remote attribute data that is associated with a time that the remote user is viewing the images displayed by the image reproducing device.

9. The image capturing method according to claim 7, comprising:
   displaying the images captured by the imaging device on a plurality of remote user image reproducing devices which are associated with different remote users;
   generating remote attribute data from a plurality of remote biological signals measured by a plurality of remote biological sensors, the remote attribute data being indicative of attributes of the remote users at a time that the remote users are viewing the images displayed by their respective remote user image reproducing devices.

10. The image capturing method according to claim 9, further comprising tuning the predetermined model based on user input from the different remote users.

11. The image capturing method according to claim 1, further comprising time synchronising the biological signals with each other and/or with the image data.

12. The image capturing method according to claim 1, wherein the attribute data comprises signal data of the measured biological signals.

13. A program comprising processor readable instructions which, when implemented by a processor, causes the processor to implement a method according to claim 1.

14. A storage medium comprising the program according to claim 13.

15. An image capturing apparatus, comprising:
   an imaging device comprising an image catcher operable to generate image data;
   an image reproducing device operable to display images based on the image data;
   a processor operable to:
      generate attribute data from a plurality of biological signals measured by a plurality of biological sensors, the attribute data being information extracted by one or more biological signals through a computational processing and being indicative of attributes of a user at a time that the user is viewing the images displayed by the image reproducing device;

generate significance data based on the attribute data, and associate the attribute data from which the significance data is generated with each displayed image, wherein the significance data are generated by comparing the attribute data with predetermined significance threshold values in order to identify a significance state for each attribute data;

control photographic parameters of the image capturing apparatus based on the attribute data, wherein controlling the photographic parameters comprises a variation of said photographic parameters as a function of a variation of at least one biological signal;

analyse the significance data to determine if the displayed images should be stored, wherein analysing the significance data comprises generating a significance level from the significance data and comparing said significance level with a triggering threshold level;

store the image data of the displayed images together with the attribute data to a storage device based on the analysed significance data.

16. The image capturing apparatus according to claim 15, further comprising a communication interface operable to receive the biological signals from the one or more biological sensors.

17. The image capturing apparatus according to claim 15, wherein the user is a local user that is local to the image capturing apparatus, and the attribute data comprises local attribute data that is associated with a time that the local user is viewing the images displayed by the image reproducing device, and the apparatus comprises:

a communication interface operable to receive remote attribute data from a plurality of remote user devices associated with different remote users, each remote user device having a respective remote image reproducing device (4) for displaying the images captured by the imaging device, and each remote user device being operable to generate the remote attribute data from a plurality of remote biological signals measured by a plurality of remote biological sensors, the remote attribute data being indicative of attributes of the remote users at a time that the remote users are viewing the images displayed by their respective remote user image reproducing devices, wherein the significance data is generated based on the local attribute data and the remoted attribute data.

18. An image capturing system comprising:
a plurality of biological sensors; and
an image capturing apparatus according to claim 15.

* * * * *